United States Patent
Bauer et al.

(10) Patent No.: US 11,667,050 B2
(45) Date of Patent: *Jun. 6, 2023

(54) LOADING APPARATUS

(71) Applicant: Weber Maschinenbau GmbH Breidenbach, Breidenbach (DE)

(72) Inventors: Sigfrid Bauer, Groß Teetzleben (DE); Axel Zimansky, Neubrandenburg (DE)

(73) Assignee: Weber Maschinenbau GmbH Breidenbach, Breidenbach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/835,773

(22) Filed: Jun. 8, 2022

(65) Prior Publication Data
US 2022/0297333 A1    Sep. 22, 2022

Related U.S. Application Data

(63) Continuation of application No. 17/385,256, filed on Jul. 26, 2021, now Pat. No. 11,383,398.

(30) Foreign Application Priority Data

Jul. 29, 2020 (EP) .................................... 20188434

(51) Int. Cl.
*B26D 7/06* (2006.01)
*B65G 17/12* (2006.01)
(Continued)

(52) U.S. Cl.
CPC ......... *B26D 7/0641* (2013.01); *B26D 7/0625* (2013.01); *B65G 1/0464* (2013.01);
(Continued)

(58) Field of Classification Search
CPC ................ B26D 7/0641; B26D 7/0625; B26D 2210/02; B26D 7/0683; B65G 17/123;
(Continued)

(56) References Cited

U.S. PATENT DOCUMENTS 1,973,919 A    9/1934   Walter
4,170,285 A    10/1979  Hinchcliffe
(Continued)

FOREIGN PATENT DOCUMENTS

DE    4032793 A1    4/1992
EP    2537651 A1    5/2017
EP    3170632 A1    5/2017

OTHER PUBLICATIONS

EP Search Report for related EP Application No. 20188434.3; dated: Feb. 5, 2021; 5 pages.

*Primary Examiner* — Mark A Deuble
(74) *Attorney, Agent, or Firm* — Dickinson Wright PLLC

(57) ABSTRACT

A loading apparatus for loading food products onto and/or into a slicing apparatus, in particular a high-speed slicer, comprises at least one magazine unit that includes a conveying means that endlessly circulates along a running direction. The conveying means is configured to lift the products to a transferring height at which the products can be transferred to the slicing apparatus and includes several product support surfaces, the product support surfaces being oriented essentially perpendicular to the running direction and positioned subsequently along the running direction with a space between each other. At least one product is loadable onto a respective product support surface for lifting the product to the transferring height.

37 Claims, 16 Drawing Sheets

Figure 2A:
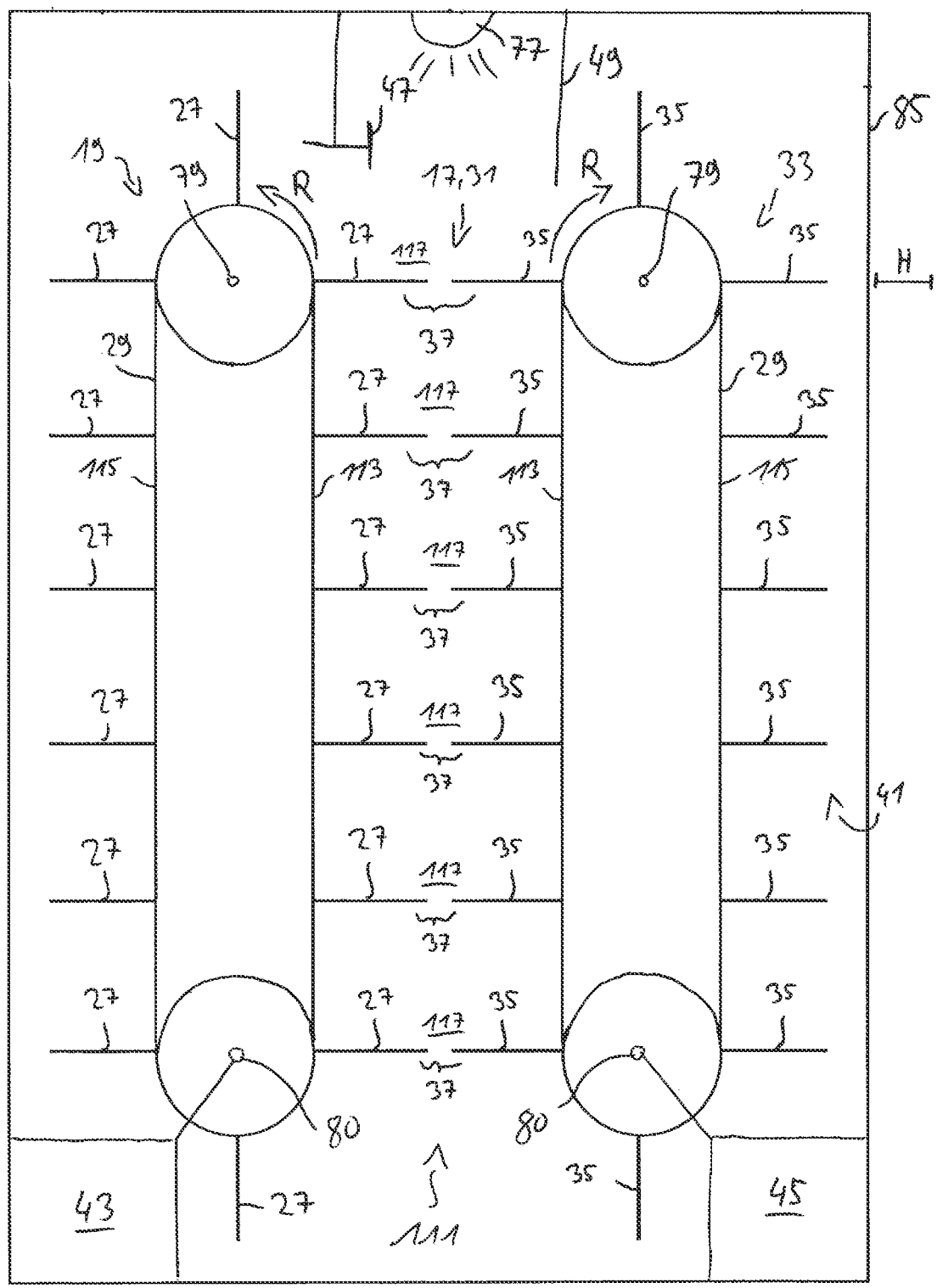
Figure 54:
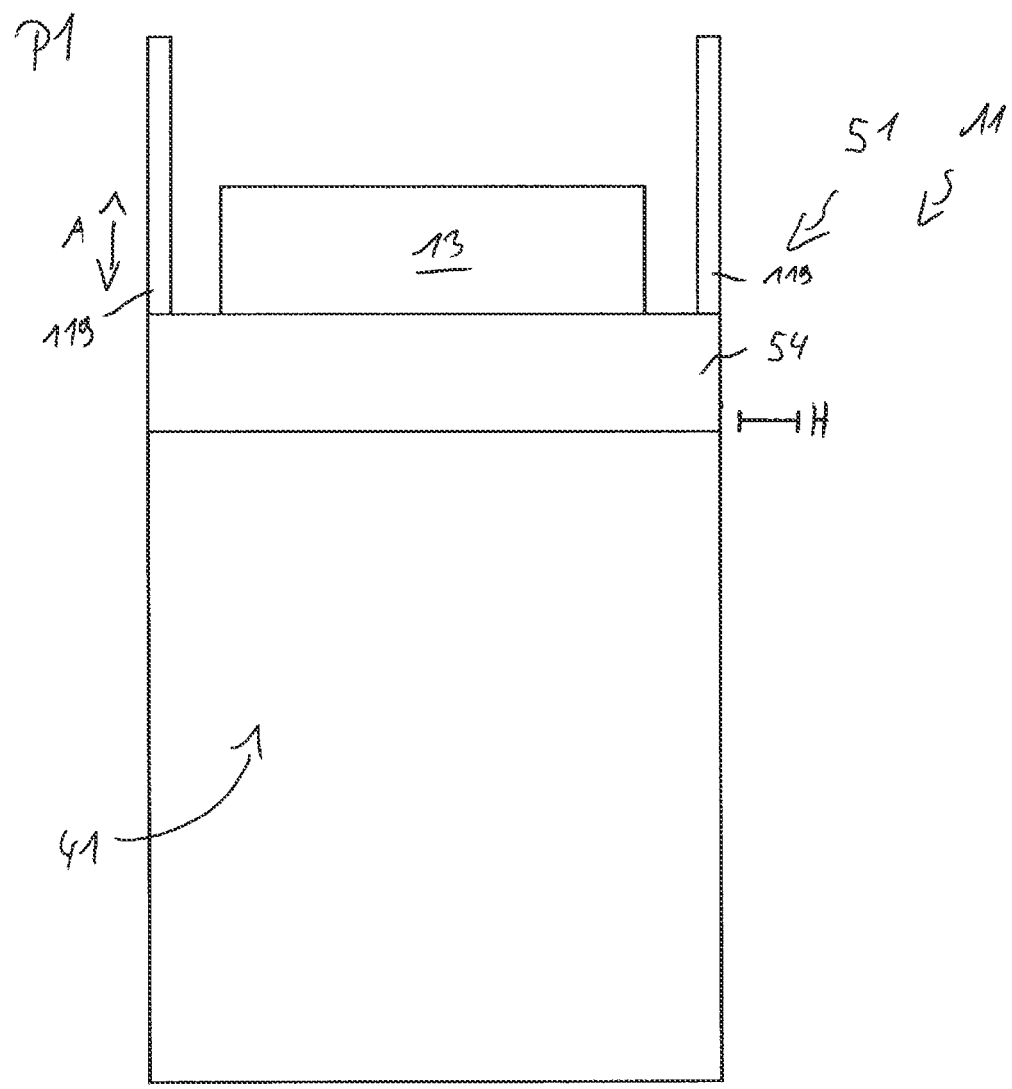

(51) Int. Cl.
  *B65G 21/20* (2006.01)
  *B65G 23/38* (2006.01)
  *B65G 47/08* (2006.01)
  *B65G 47/57* (2006.01)
  *B65G 47/82* (2006.01)
  *B65G 47/88* (2006.01)
  *B65G 1/04* (2006.01)
  *B65G 1/07* (2006.01)
  *B65G 1/08* (2006.01)
  *B65G 17/34* (2006.01)

(52) U.S. Cl.
  CPC ................ *B65G 1/07* (2013.01); *B65G 1/08* (2013.01); *B65G 17/123* (2013.01); *B65G 17/34* (2013.01); *B65G 21/2045* (2013.01); *B65G 23/38* (2013.01); *B65G 47/08* (2013.01); *B65G 47/57* (2013.01); *B65G 47/82* (2013.01); *B65G 47/8807* (2013.01); *B26D 2210/02* (2013.01); *B65G 2203/0233* (2013.01)

(58) Field of Classification Search
  CPC .... B65G 21/2045; B65G 23/38; B65G 47/08; B65G 47/57; B65G 47/82; B65G 47/8807; B65G 2203/0233; B65G 1/06; B65G 1/07; B65G 1/08; B65G 1/0464; B65G 17/34; B65G 47/06
  See application file for complete search history.

(56) References Cited

U.S. PATENT DOCUMENTS

| | | |
|---|---|---|
| 6,152,670 A | 11/2000 | Onnerlov |
| 10,457,496 B2 | 10/2019 | Philipp |
| 10,836,065 B2 | 10/2020 | Garcia-Perez et al. |
| 11,383,398 B2 * | 7/2022 | Bauer ................ B65G 1/0464 |
| 2002/0098791 A1 | 7/2002 | Handel et al. |
| 2002/0153169 A1 | 10/2002 | Sewell |
| 2011/0099948 A1 | 5/2011 | Drebing et al. |
| 2018/0215558 A1 | 8/2018 | Ernst et al. |

* cited by examiner

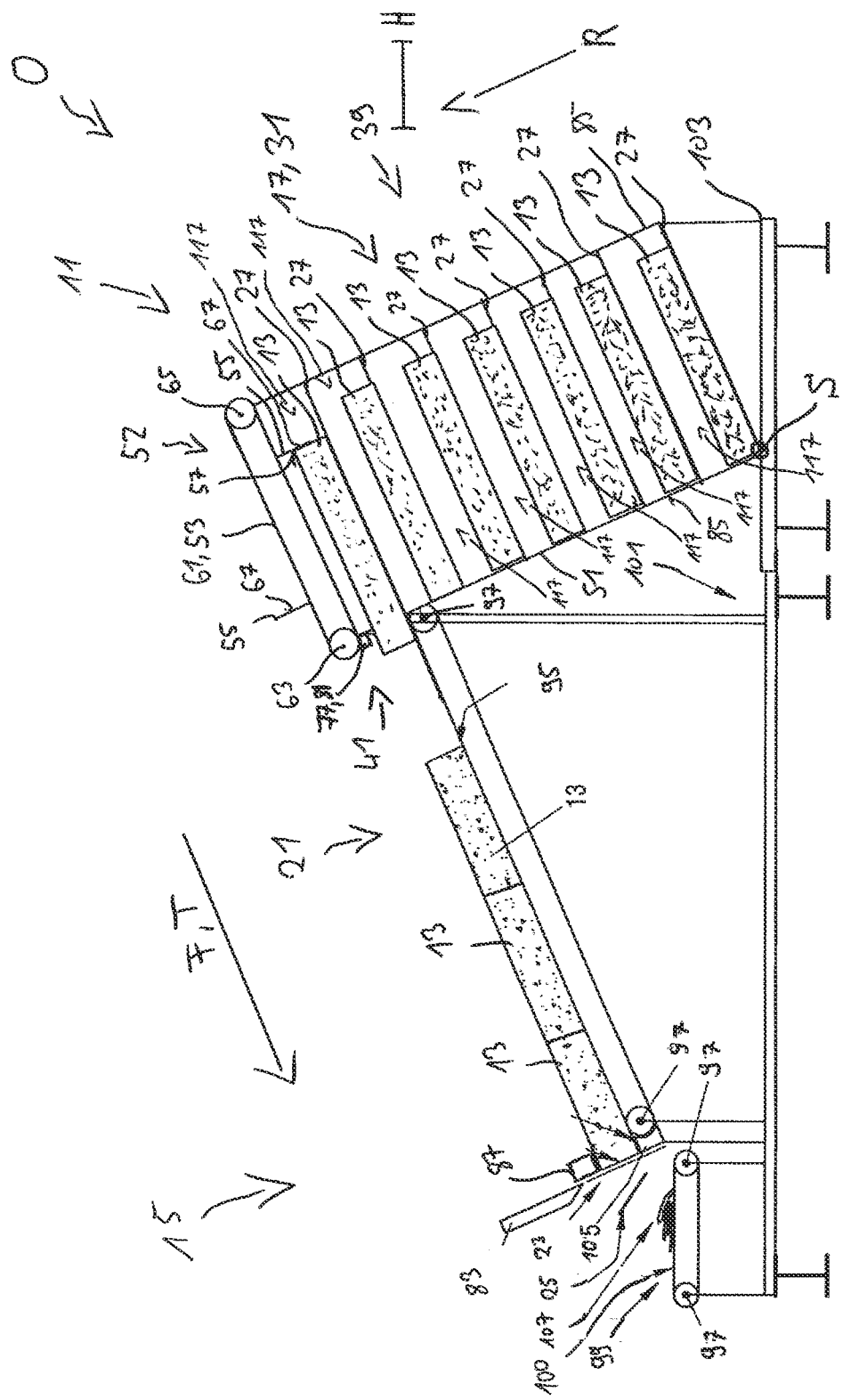

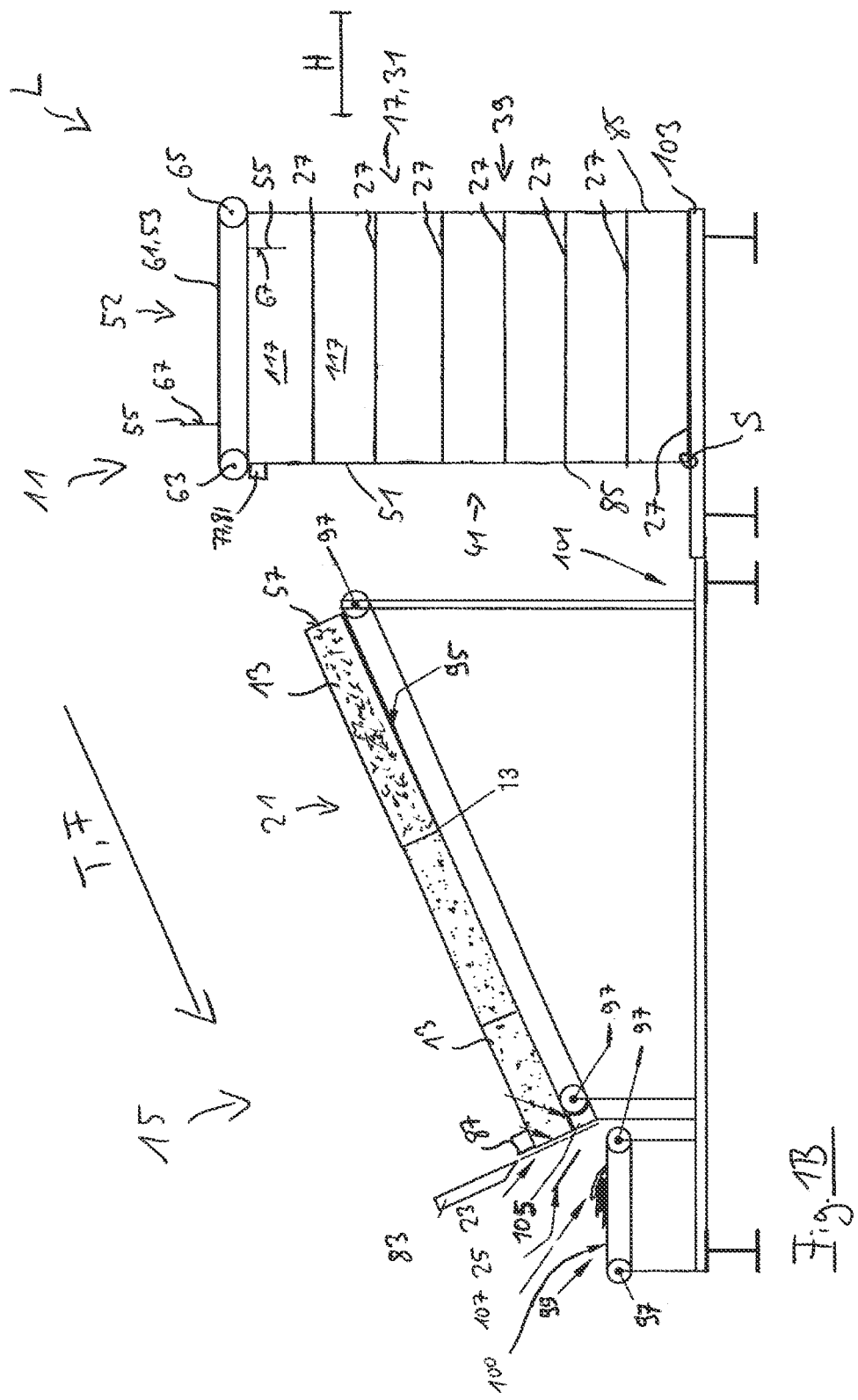

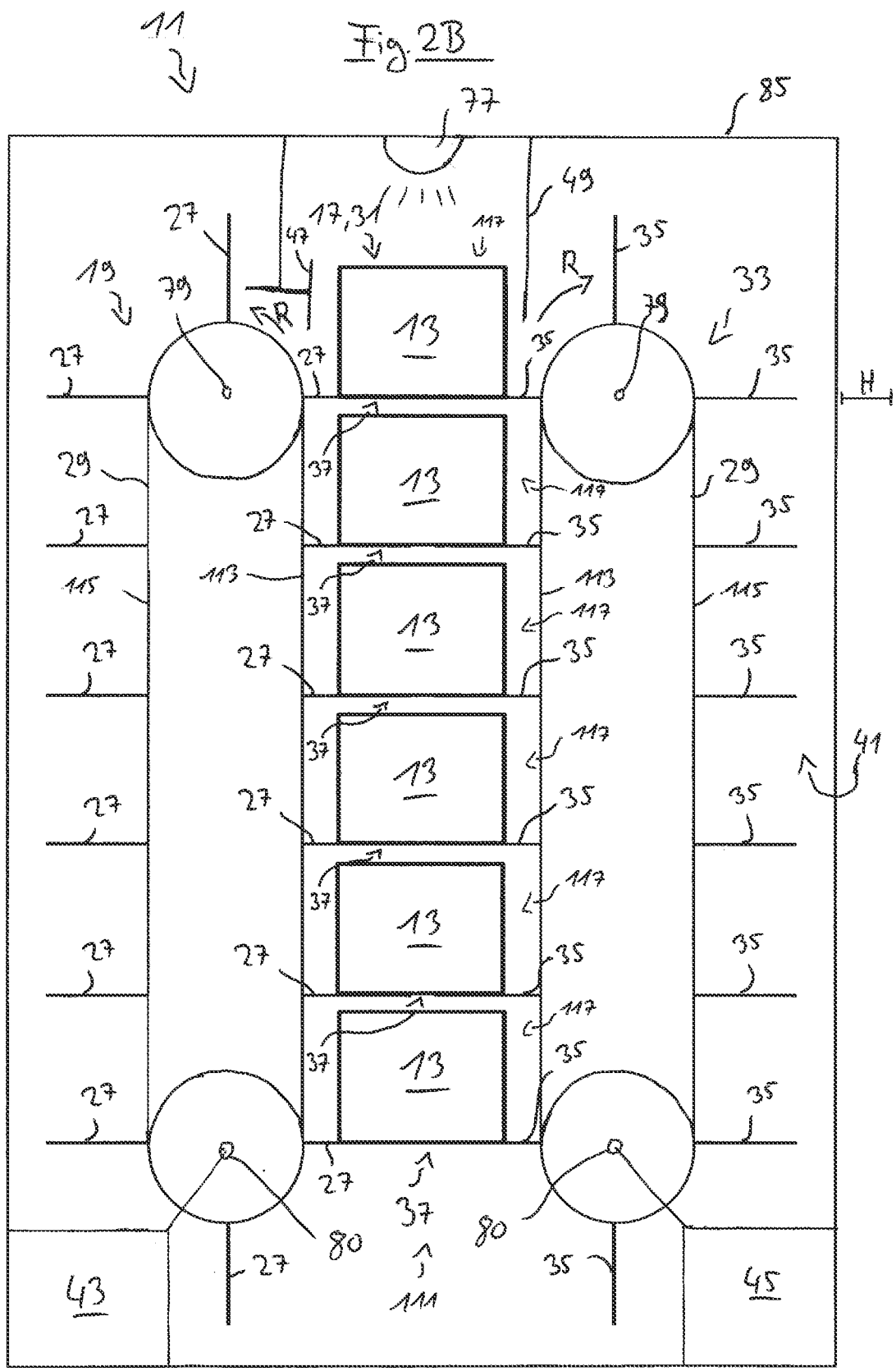

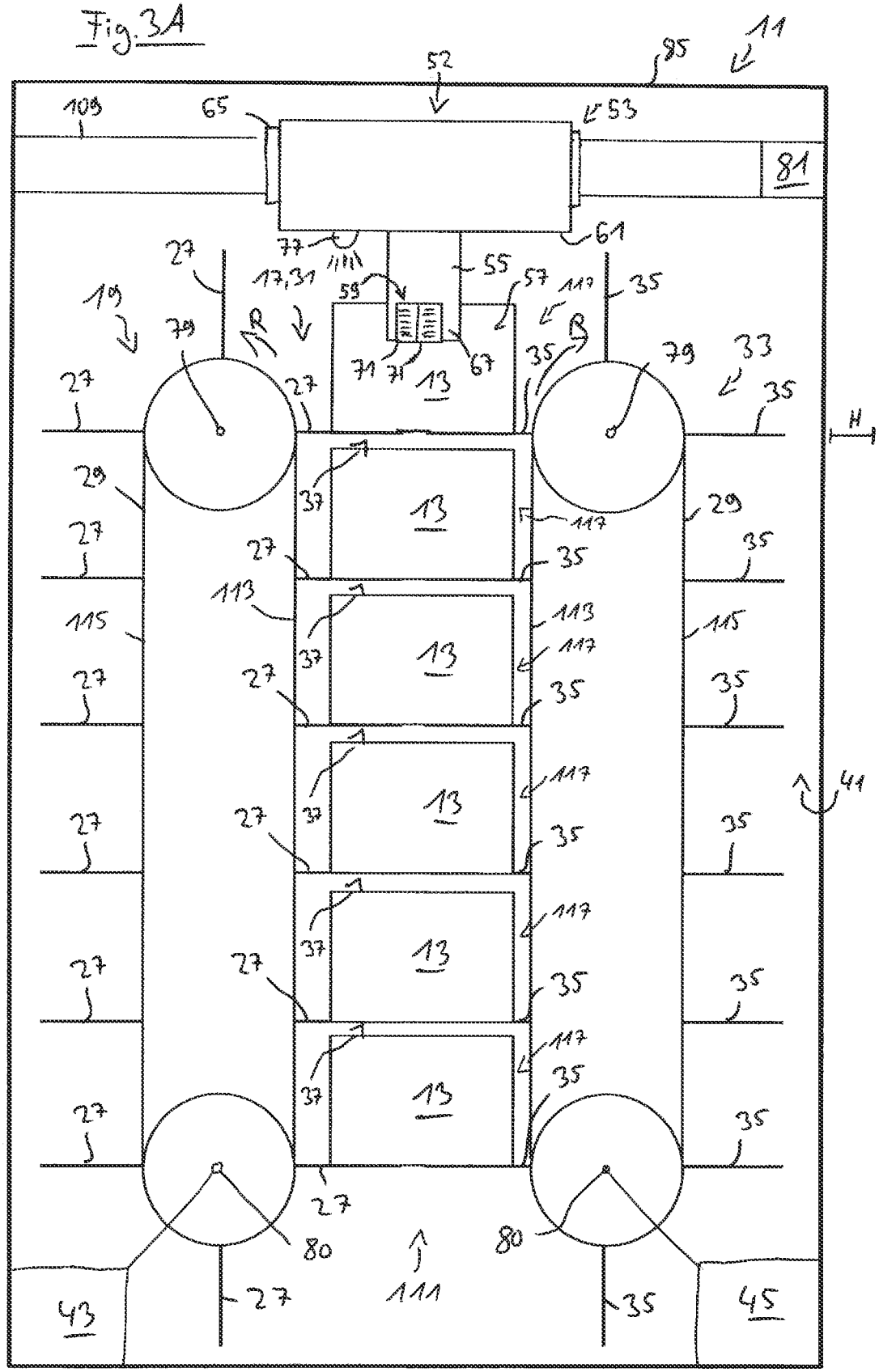

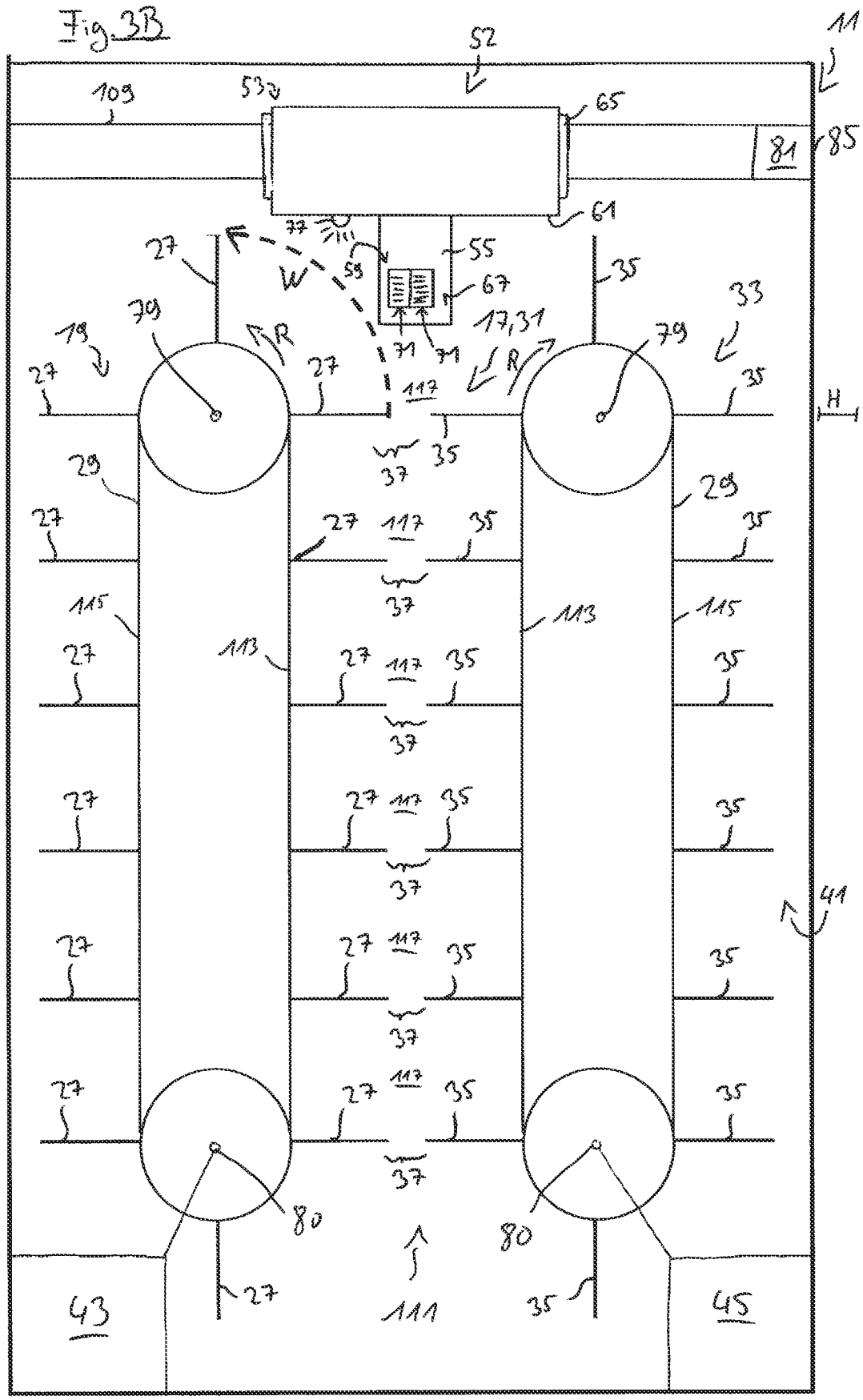

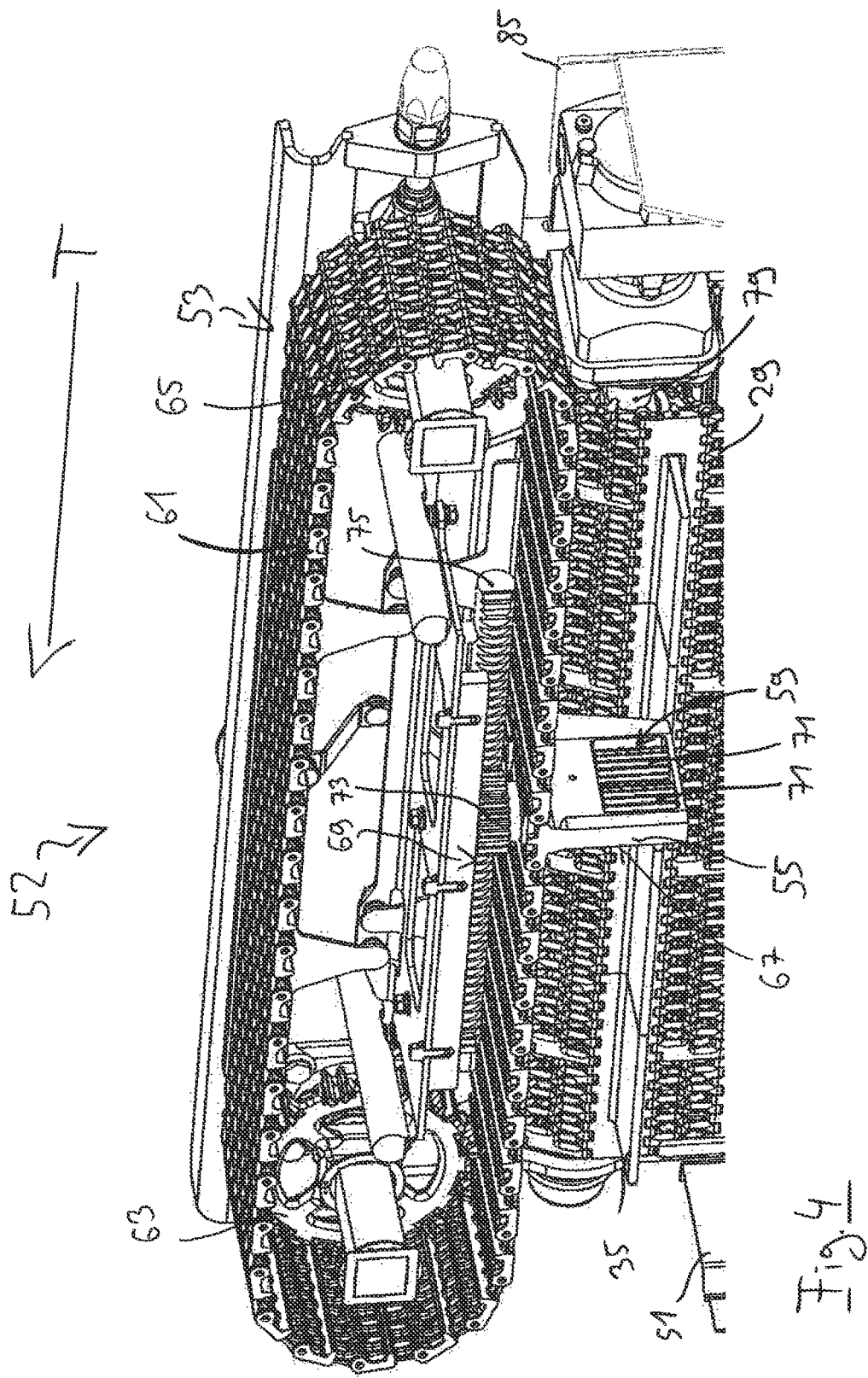

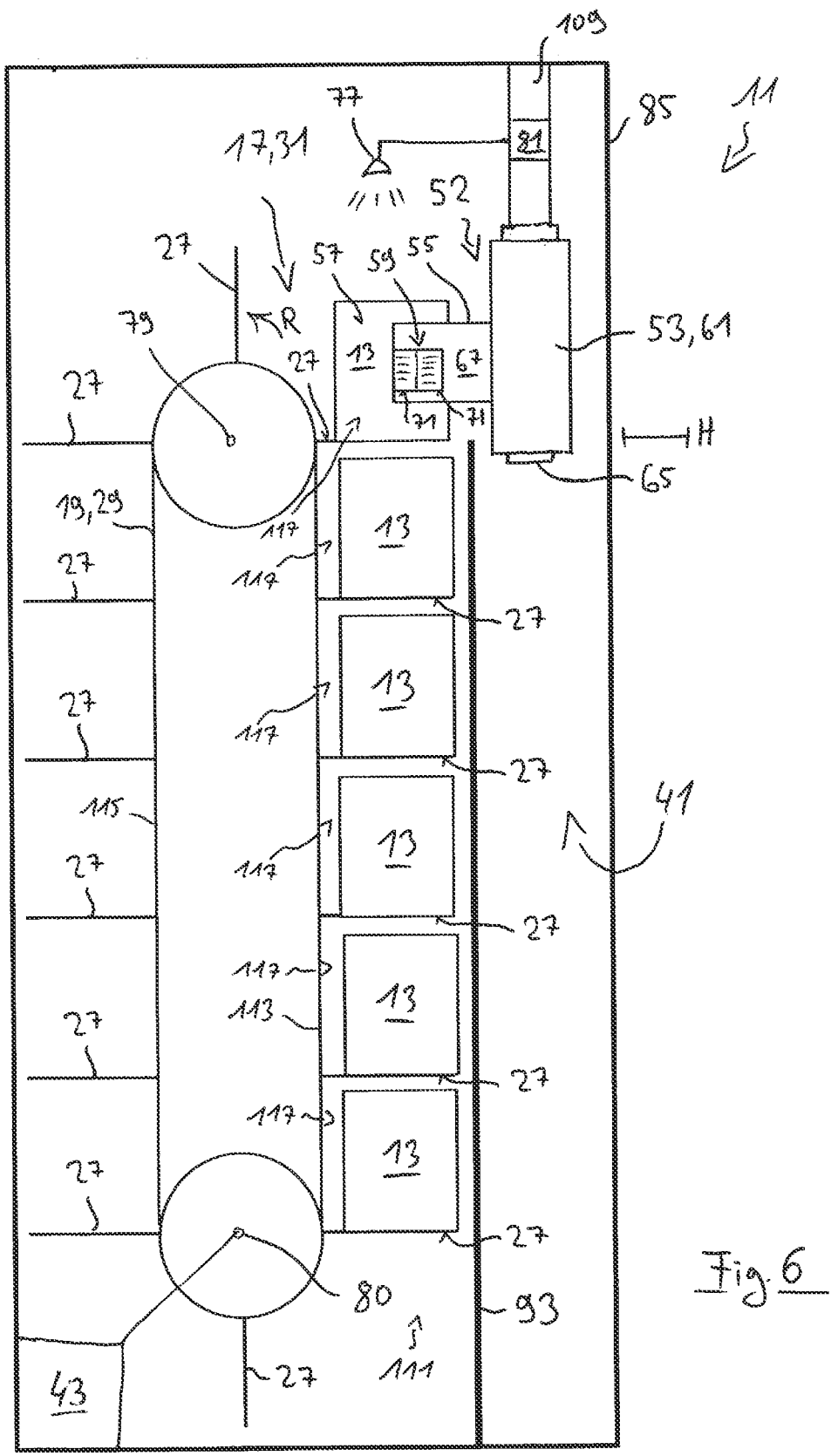

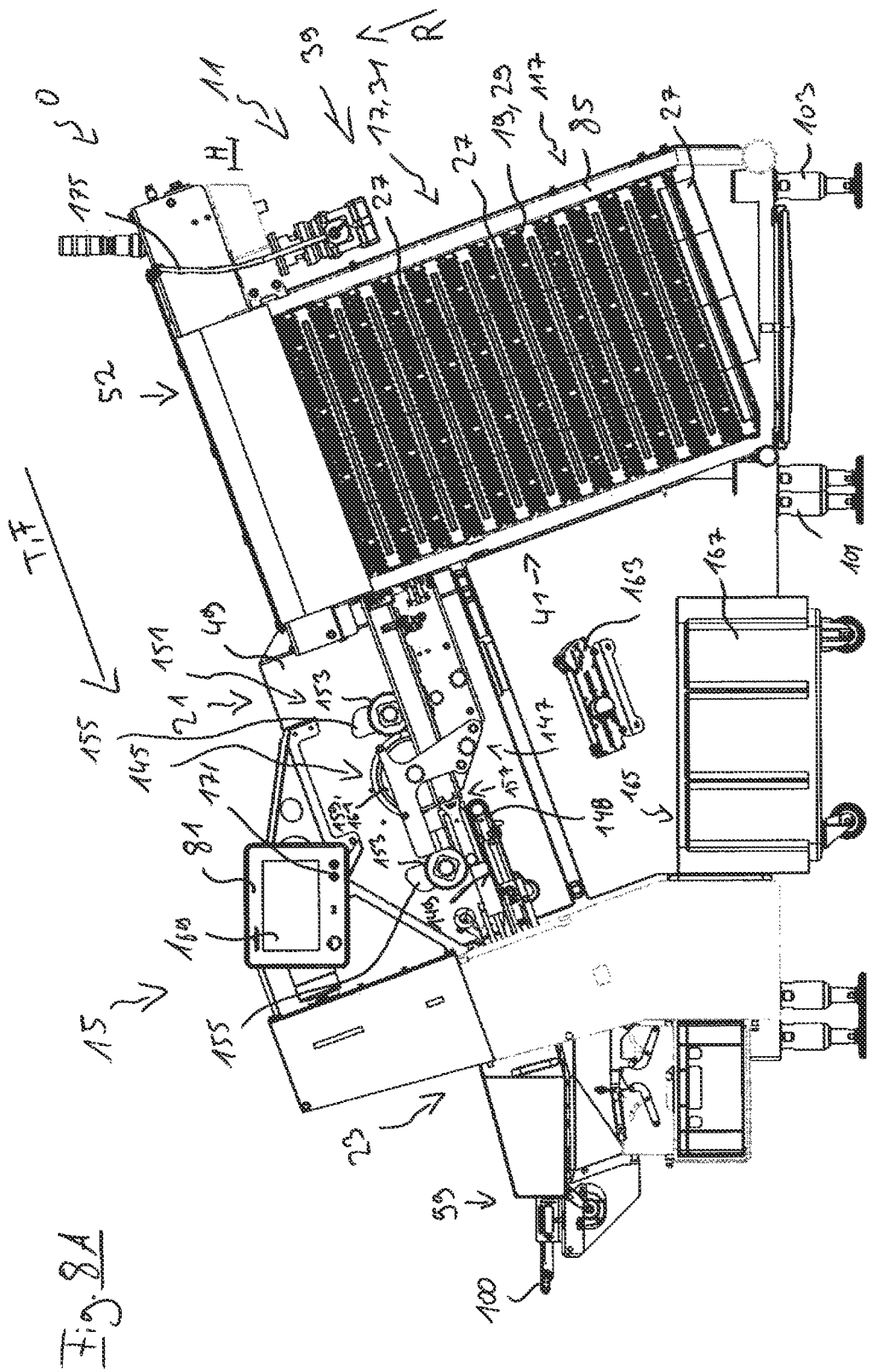

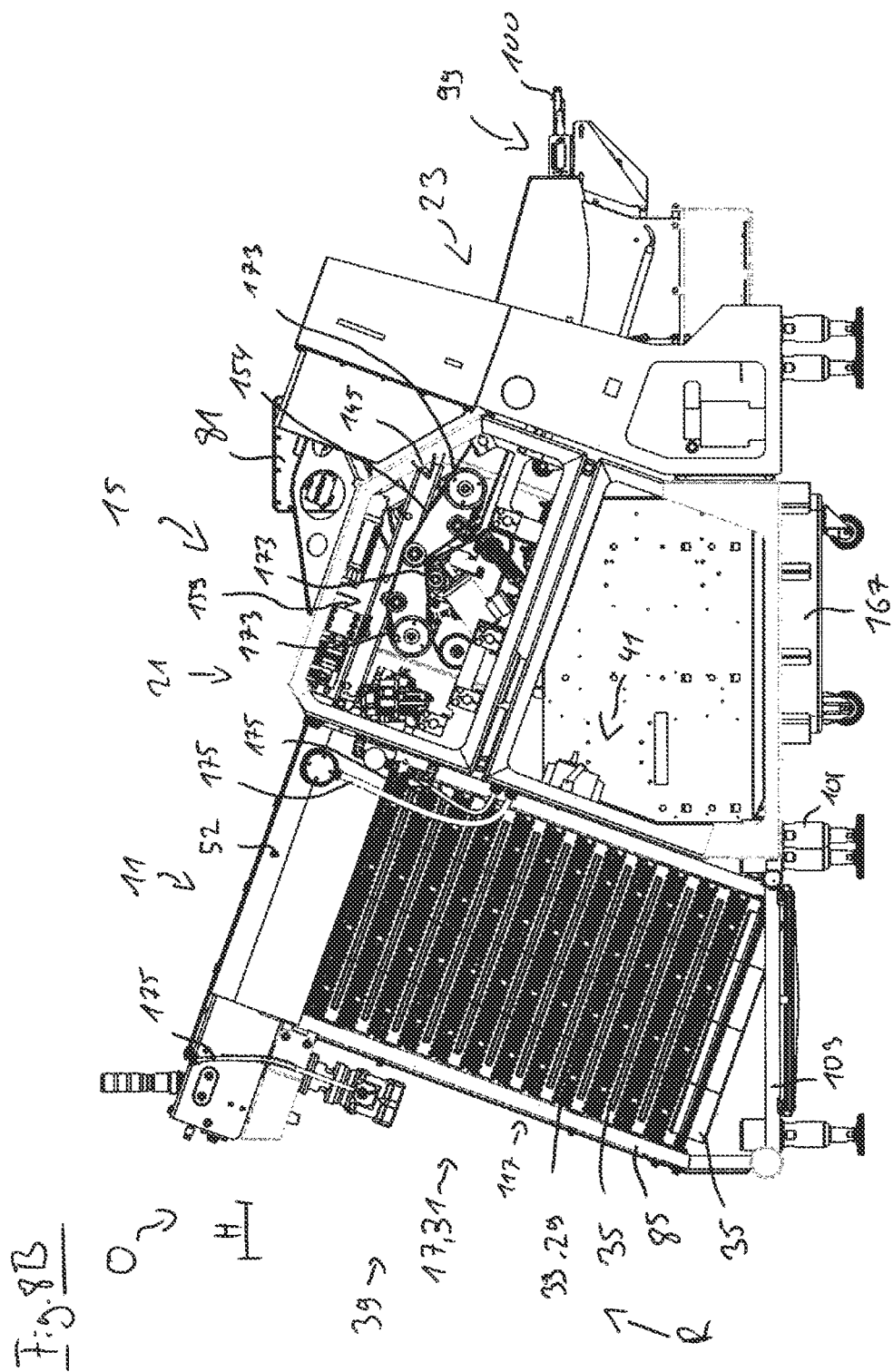

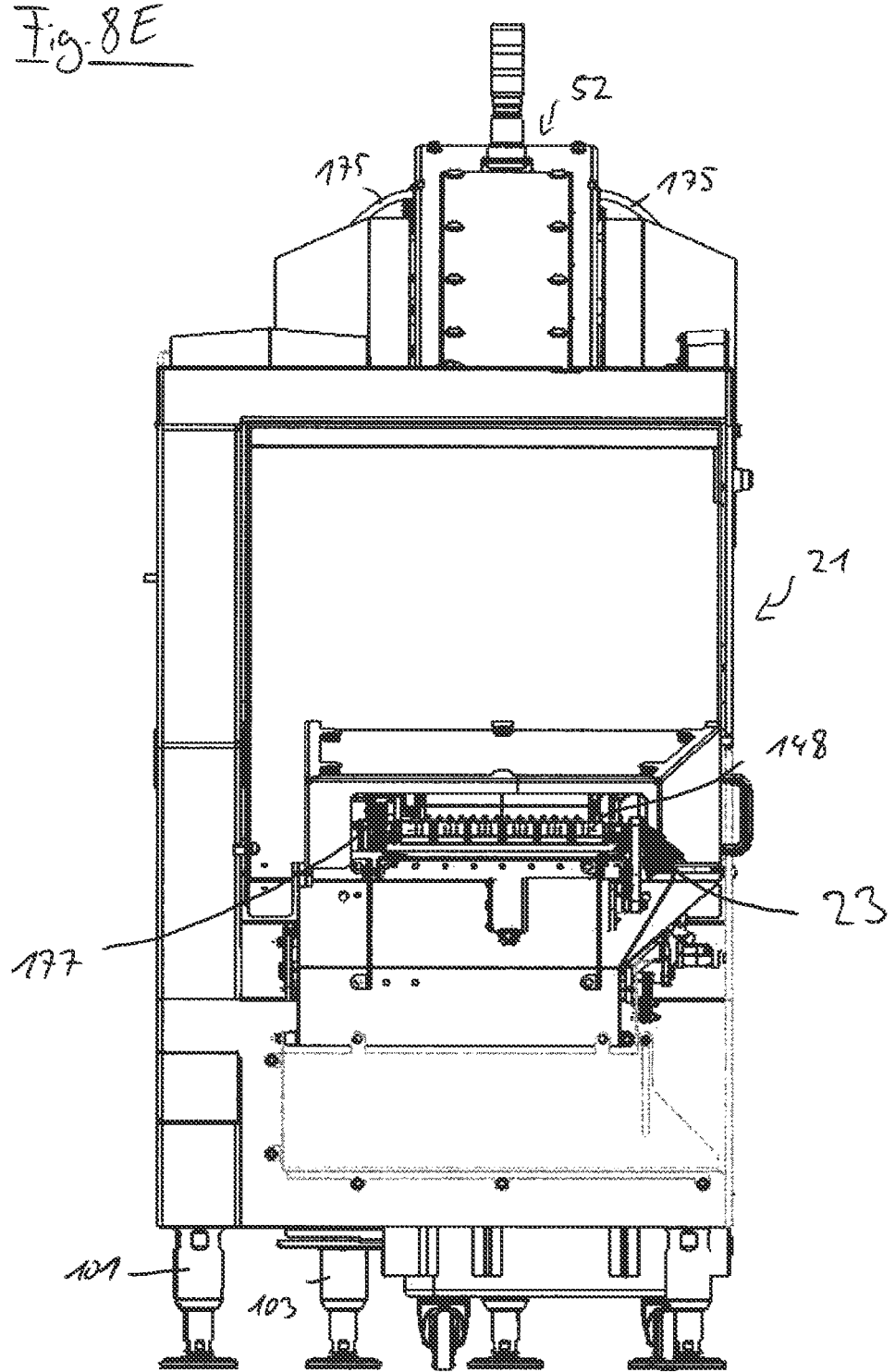

LOADING APPARATUS

CROSS-REFERENCE TO APPLICATIONS

This application is a continuation application of U.S. application Ser. No. 17/385,256, filed Jul. 26, 2021, which claims priority to European Application No. EP 20188434.3, filed on Jul. 29, 2020, which are both incorporated herein by reference in their entirety.

The invention relates to a slicing apparatus, in particular to a high-speed slicer, for slicing food products into slices, the slicing apparatus comprising a feeding unit that is configured to feed products along a feeding direction into a cutting region in which a blade for slicing the products into slices is arranged.

During the processing of food products, product loafs may be cut into slices and a predetermined number of slices may be collected to form a portion. Also one slice or piece of the product may, in principle, be provided as a portion. In other words, a portion may be formed by one single slice or piece of the product. In turn, the generated portions may be packaged and sold to retailers or consumers. For example, meat products, e.g. bacon, or cheese loafs may be sold as packaged portions of a certain number of slices.

To enable a highly efficient processing of the products and maximize the product throughput, a high level of automation is aimed at and usually high-speed slicing apparatuses, often called slicers, are used for producing the slices. Such high-speed slicers feature slicing velocities ranging from several hundreds to about 1,500 cuts per minute depending on the product to be sliced and, e.g., the thickness of the slices. Further, such an automatic slicing apparatus may be part of a production line automatically linking several processing steps. For example, the generated slices may be collected in a collecting area to form a portion and a completed portion may be transferred automatically to a packaging machine, where the portions may be packaged to essentially conclude the product processing. Thus, the entire production of packaged portions of food slices produced from a food loaf may in principle be automated.

However, in order to achieve a continuous and efficient working process, loafs to be sliced need to be constantly provided and delivered to the slicing apparatus. The products may be loaded onto the feeding unit of the slicing apparatus, which may feed the products to the cutting region where the slices are cut off. Depending on the type and size of the products, it may also be possible to place several abut-ting products onto such a feeding unit in order to increase the time span during which continuous cutting is possible without needing to provide further products.

While the possibility to load several products onto a feeding unit may increase the time of continuous processing, the products commonly need to be loaded menu-ally onto the feeding unit by an operator supervising the production process. Thus, if the supervising person misses that a slicing apparatus completed the slicing of products that have been loaded onto the feeding unit, the product supply may be interrupted, and the entire production process can stagnate. In particular in case an operator needs to monitor several product lines or has to fulfil further duties besides loading the products onto the feeding unit, e.g. regarding maintenance works or logistic questions, such breaks in the production process due to a slicing apparatus running out of products to be sliced may occur and lead to significant inefficiencies in the production process.

Additionally, loading the products manually onto the feeding unit or the slicer is usually a very power demanding and exhausting work since the products need to be lifted comparably high to place them onto the feeding unit. In particular, manually loading products onto the feeding unit from a rear end of the feeding unit may be demanding since the feeding unit may be declining towards the cutting region, such that the feeding unit may extend to a comparably high height at its rear end.

Accordingly, there is a need for improved options to load products onto or into a slicing apparatus in order to ease the loading and achieve a continuous processing of the products.

This problem is solved by a slicing apparatus with the features according to claim 1, which in particular comprises a loading apparatus for loading the food products onto and/or into the slicing apparatus. The loading apparatus comprises at least one magazine unit, the at least one magazine unit including a conveying means that endlessly circulates along a running direction, wherein the conveying means is configured to lift the products to a transferring height at which the products can be transferred to a feeding unit of the slicing apparatus, the feeding unit being configured to feed the products to a cutting region in which the products are cut into slices. The conveying means includes several product support surfaces, which are orientated essentially perpendicular to the running direction and positioned subsequently along the running direction with a space between each other. At least one product is loadable onto a respective product support surface for lifting the product to the transferring height. In particular, the product support surfaces may be spaced with an equal distance between each other.

The loading apparatus enables to automatically lift the products to a transferring height at which the products may be transferred to the feeding unit of the slicing apparatus. Hence, the products do not need to be lifted manually but may be loaded onto the loading apparatus at a convenient height, while the lifting of the products may be performed automatically. In particular, the transferring height may equal the height of a rear end of the feeding unit, such that products lifted to the transferring height may be slid or pushed to the feeding unit. Further, the transferring height may be slightly higher than the rear end of the feeding unit to enable a similar product transfer.

To transfer products that have been lifted to the transferring height to the feeding unit, an operator may manually slide the products in a transferring direction onto the feeding unit. While this still requires some manual action to convey a product to the feeding unit, the loading of the slicing apparatus may nevertheless be significantly eased since automatic product lifting is provided. Alternatively, a device that is configured to automatically transfer products at the transferring height to the feeding unit may be arranged as a part of or in conjunction with the loading apparatus. E.g., an entraining device may be arranged above or lateral of a product that has been lifted to the transferring height to automatically move the product towards the feeding unit. Further, the feeding unit may comprise a means for feeding the products to the cutting region that may also be configured to move products at the transferring height from the loading apparatus to the feeding unit. For example, the feeding unit may comprise a food gripper that guides or moves the products to the cutting region and the food gripper may be used to convey products from the loading apparatus to the feeding unit. Alternatively, a robot may be provided to forward a product to the feeding unit after having been lifted to the transferring height by the loading apparatus.

In addition, since the conveying means, which is configured to lift the products to the transferring height, includes several product support surfaces, it may be possible to load a plurality of food products onto the magazine unit with each product being loaded onto a respective product support surface. Thus, a certain number of products may be stored in the magazine unit and the products may be lifted subsequently to the transferring height to be transferred to the feeding unit of the slicing apparatus. This enables to continuously supply the slicing apparatus with products to be cut and a product may be transferred to the feeding unit as soon as there is enough space released on the feeding unit through the processing of pre-ceding products. In particular in case the products are transferred automatically to the feeding unit, this storing of products allows an operator to fill the product magazine with products and afterwards pursue further duties while the stored products are automatically lifted and fed to the cutting region. Only after the entirety of products stored in the magazine unit has been transferred to the feeding unit, further products need to be supplied, e.g. loaded manually onto the loading apparatus.

The conveying means may circulate endlessly along the running direction between an upper deflection and a lower deflection, such that a first run of the conveying means is moving upwards between the lower deflection and the upper deflection while the other run is moving downwards. The product support surfaces of the first, upward moving run of the conveying means may be oriented towards a lifting area of the magazine unit and products placed onto product support surfaces extending into the lifting area may be lifted upwards.

While the running direction is oriented such that products in said lifting area are lifted upwards to the transferring height, the lifting does not necessarily need to be rigorously vertical. Rather, the running direction may be oriented such that a motion of a first run between a lower deflection and an upper deflection is inclined to the vertical. In particular, the first run may move perpendicular to a feeding direction in which the products are fed to the cutting region by the feeding unit, such that the product support surface protruding essentially perpendicular from the first run may be oriented parallel to the feeding direction. With such an orientation of the running direction, products lifted to the transferring height may be transferred in a straight line, in the feeding direction, to the feeding unit and fed to the cutting region. Hence, axes of deflections of the conveying means may be parallel to the feeding direction.

In particular, the first run may be inclined with an angle of approximately 20° to the vertical, such that products lifted to the transferring height and loaded onto a respective product support surface may be transferred to the feeding unit at an angle of approximately 20° towards the horizontal. However, steeper inclinations or a vertical orientation of the first run are possible, in particular in dependence on the inclination of the feeding unit in order to arrange the product support surfaces at the lifting height parallel to the feeding unit. In principle, the products may also be lifted along the vertical even if the feeding unit is inclined and the products can be transferred horizontally to the inclined feeding unit.

Further, the loading apparatus may be movable between a loading position in which the product support surfaces are oriented horizontally to load products onto the loading apparatus and an operation position in which the product support surfaces may be inclined.

The products may be transferred to the feeding unit and fed to the cutting region along a straight line, such that the aforementioned lifting area may be understood as an inner part of the loading apparatus or the magazine unit, while the run of the conveying means heading downwards may be understood to form an outer part. For example, the loading apparatus may comprise a wall member or a frame opposing the first run such that products loaded onto the product support surfaces are prevented from falling off during the lifting. Alternatively, a further conveying means may be provided that circulates along the running direction in a counter-rotating way and the product support surfaces of both conveying means may move upwards in the inner lifting area. In such an embodiment, products may be lifted by both conveying means and prevented from sliding off the respective product support surfaces by the opposing conveying means.

In general, the loading apparatus may be fixed to or integrated into the slicing apparatus, or the loading apparatus may be configured as a separate unit that may be attached selectively to the other components of the slicing apparatus. As such, the invention also relates—independently of the connection with a slicing apparatus described above—to a loading apparatus for loading food products onto and/or into a slicing apparatus, comprising at least one magazine unit, the at least one magazine unit including a conveying means that endlessly circulates along a running direction, wherein the conveying means is configured to lift the products to a transferring height at which the products can be transferred to a feeding unit of the slicing apparatus, the feeding unit being configured to feed the products to a cutting region in which the products are cut into slices. The conveying means includes several product support surfaces, which are orientated essentially perpendicular to the running direction and positioned subsequently along the running direction with a space between each other. At least one product is loadable onto a respective product support surface for lifting the product to the transferring height. In particular, the product support surfaces may be spaced with an equal distance between each other. The loading apparatus may, in principle, be configured according to any one of the aspects disclosed herein regarding the loading apparatus as a part of the slicing apparatus.

Further embodiments are disclosed in the depending claims, the following description, and the drawings.

According to an aspect, the conveying means may include an endless member that endlessly circulates along the running direction, wherein the product support surfaces protrude from the endless member. In particular, the endless member may be a link belt, a chain and/or a conveyor belt. The endless member may be guided via an upper deflection and a lower deflection such that a first run of the endless member may move upwards to accomplish the lifting of products loaded onto the corresponding product support surfaces. The other run of the endless member may accordingly move downwards from the upper deflection to the lower deflection essentially endlessly providing product support surfaces for subsequent products to be lifted to the transferring height.

The product support surfaces may be replaceable and/or changeable according to another aspect. The product support surfaces may be directly or indirectly, e.g. via a mounting, fastened to the endless member. To change or replace the product support surfaces, the product support surfaces may be detachable from the endless member to flexibly equip the loading apparatus with product support surfaces that are optimally adjusted to a respective product or product type that needs to be lifted. For example, product support surfaces of different sizes may be mounted on the endless member depending on the size of the products that need to be supplied.

According to another aspect, the at least one magazine unit may form a store for a plurality of products, the store providing a respective product support surface for each of the plurality of products, wherein the plurality of products may be liftable simultaneously by the loading apparatus. To form the store, the magazine unit may include several product support surfaces that extend into a lifting area and products loaded onto these product support surfaces are lifted simultaneously. Hence, the length of the conveying means may be such that on each run, in particular spanning from a lower deflection to an upper deflection, several product support surfaces may be arranged and the products loaded onto the several product support surfaces protruding from the upwards moving run are lifted simultaneously. In principle and in particular depending on the product type, it may also be possible to load several products onto a common product support.

Within the store, two adjacent product support surfaces may form a compartment for a respective product. For example, the magazine unit may comprise at least eight, at least ten or at least twelve compartments facilitating simultaneous loading and lifting of the corresponding number of products. The uppermost compartment may be formed solely by the respective product support surface at the transferring height, while the subsequent product support surface along the running direction may already bend around an upper deflection.

With the magazine unit forming a product store, the loading apparatus may—in addition to lifting the products to the transferring height and enabling a more ergonomic working for the operators supervising the slicing process—be used as a product buffer to increase the time span during which products may be processed without any manual loading action required. In particular in case products lifted to the transferring height may be transferred automatically to the feeding unit, possibilities for an operator to fulfill further tasks without a production line stopping due to a lack of products supplied to the slicing apparatus can be created by providing such a product buffer.

According to another aspect, the magazine unit may include a further conveying means that endlessly circulates along the running direction, wherein the further conveying means may include several further product support surfaces that are oriented essentially perpendicular to the running direction, and wherein the number of product support surfaces of the conveying means may equal the number of further product support surfaces of the further conveying means. In particular, the further conveying means may be circulating along the running direction in a counter-rotating way compared to the conveying means. By such an arrangement, opposing runs of the conveying means and the further conveying means in an inner area can each move upwards to jointly form a lifting area in which the products are lifted. The conveying means and the further conveying means may circulate at the same speed, such that the product surfaces and the further product surfaces may keep the same distance between each other along the running direction during the processing.

By providing a further conveying means, products loaded onto the product support surfaces and/or the further product support surfaces may be laterally supported at both sides by the opposing runs of the conveying means and the further conveying means. Hence, the products may be prevented from laterally sliding off the product support surfaces and/or the further product support surfaces. For example, the further product support surfaces may be oriented such that they extend towards the conveying means between two adjacent product support surfaces. In this case, a respective product support surface, a respective further product support surface and the opposing runs of the conveying means and the further conveying means may form a compartment for a product.

Further, according to another aspect, the conveying means and the further conveying means may be oriented oppositely to each other such that a respective product support surface of the conveying means and a respective further product support surface of the further conveying means are located at the same height regarding the running direction and jointly form a product support.

In embodiments according to this aspect, the conveying means and the further conveying means may circulate at the same speed and product support surfaces and further product support surfaces opposing each other may be kept at the same height relative to each other. This enables to form product supports onto which a product to be lifted may be loaded, wherein the product supports each comprise a respective product support surface and the corresponding further product support surface. Accordingly, a product loaded onto the product support may jointly be supported at its bottom side by the product support surface and the corresponding further product support surface that form the product support. In particular, providing such product supports may increase the stability of the magazine unit since the individual product support surfaces and further product support surfaces may extend less far from the conveying means, in particular an endless member of the conveying means, while facilitating the joint lifting of comparably broad products.

Further, the product supports may form a store for products to be lifted simultaneously and two subsequent product supports can form a compartment for a product.

In particular, the products may be loaded subsequently onto the product supports, e.g. manually, while the loading apparatus may also be arranged for simultaneously receiving several products that are loaded to the respective product supports and/or the product support surfaces. For example, a plurality of products may be provided by a carriage matching the number and spacing of the compartments formed by the product supports and/or the product support surfaces to facilitate automatic loading of the magazine unit after the store has been emptied. To ease such an automatic loading, the loading apparatus may be movable, e.g. pivotable, to a loading position in which the product supports are oriented horizontally. During operation, however, the loading apparatus and/or the magazine unit may be arranged in an operation position in which the product supports are inclined to the horizontal.

According to another aspect, the magazine unit may comprise an entrance side at which the products can be loaded onto the product support surfaces and the magazine unit may comprise an exit side opposing the entrance side, wherein products lifted to the transferring height can be transferred to the feeding unit via the exit side. In particular, the entrance side may constitute a handling side via which products may be loaded onto the magazine unit while the exit side may be directed towards the feeding unit. Thus, the processing of the products may be performed essentially—except for the lifting—along a straight line with the products being loaded from the entrance side and straightly being transferred to the feeding unit, which straightly feeds the products to the cutting region.

The conveying means and the further conveying means, according to another aspect, may each comprise a respective driving means. The driving means may be configured to circulate the conveying means and the further conveying means at the same speed, in particular in case the product support surfaces and the further product support surfaces jointly form product supports for the products to be lifted.

Accordingly, the conveying means and the further conveying means may be synchronized. Alternatively, a single driving means for the conveying means and the further conveying means may be provided with a clutch ensuring the synchronous circulation of the conveying means and the further conveying means.

According to another aspect, at least one pressing member may be provided that is configured to push a product lifted to the transferring height against a lateral border of the loading apparatus. In particular, the pressing member may push a front part of the product against the lateral border to prevent a product lifted to the transferring height from sliding towards the feeding unit in an uncontrolled way. The pressing member may also impinge on the entire product to align the product with the feeding unit before a transfer of the product. Further, at least two pressing members may be provided opposing each other in order to accurately center a product that has been lifted to the transferring height before transferring the product to the feeding unit. For example, the pressing member may be configured as a sheet metal that is movable by a pneumatic cylinder and/or as a spring-loaded sheet metal. In particular, the pressing member may be released and/or the pneumatic cylinder may be actuated as soon as a product reaches the transferring height.

According to another aspect, the slicing apparatus may comprise more than one feeding unit and/or the feeding unit may be configured to feed the products in several lanes into the cutting region, wherein the pressing member may be configured to control onto which feeding unit and/or lane the product is transferred. For example, the slicing apparatus may comprise two, three or four feeding units for feeding the products into the cutting region or the feeding unit may be configured to feed the products in two, three or four lanes into the cutting region. Products fed in different lanes and/or by different feeding units may be cut by a single blade in the cutting region or for each lane respectively feeding unit, a corresponding blade may be provided. In case more than one lane and/or feeding unit is provided, the products may be transferred to the respective lane and/or feeding unit according to any product parameter, e.g. a product weight or quality parameter, or in a predetermined order. For example, the slicing apparatus may comprise a measuring device or a product scanner in order to infer product parameters, which may comprise a camera and/or at least one LED to illuminate a product and infer a product contour and/or a product surface. Based on this information, the product weight may be estimated assuming a constant product density or a quality parameter of the product may be inferred. Further, the slicing apparatus and/or the loading apparatus may comprise a weighing device for measuring the product weight.

According to another aspect, the product can be transferred to the feeding unit in a transferring direction and the magazine unit may include a blocking member, the blocking member being arranged to prevent products that are below and/or above the transferring height from moving in the transferring direction. In particular, the blocking member may be a wall or barrier of the loading apparatus facing the feeding unit, and, e.g., be implemented as a metal sheet.

The blocking member may be arranged behind the conveying means and/or the further conveying means as viewed along the transferring direction. In particular, the blocking member may be arranged at an exit side of the loading apparatus. By blocking a motion of products in the transferring direction, in particular below the transferring height, the blocking member may close compartments for the products, which are formed by the product support surfaces, the further product support surfaces and/or the product supports, in the transferring direction towards the feeding unit. Thus, it may be ensured that the products are properly lifted to the transferring height without the risk of products slipping off the product support surfaces due to an inclination of the product support surfaces. However, these compartments may be accessible from an entrance side of the loading apparatus that opposes the blocking member in the transferring direction to load products onto the product support surfaces. The blocking member may extend only up to the transferring height and products lifted to the transferring height may be transferred to the feeding unit in the transferring direction without being hindered by the blocking member. Accordingly, the uppermost compartment may be formed only by the respective product support surface and/or the respective further product support surface and/or the respective product support being arranged at the transferring height.

According to another aspect, the blocking member may be movable between a release position and a blocking position, wherein a motion in the transferring direction of a product being at the transferring height is enabled in the release position and prevented in the blocking position. For example, the blocking member may be configured as or include a movable barrier to enable or block a transfer of a product at the transferring height. Thus, products lifted to the transferring height may be transferred in a controlled way and only in case the blocking member has been moved to the released position, while an unintended sliding of a product towards the feeding unit may be prevented by arranging the blocking member in the blocking position. In particular, the blocking member may be connected to a controller of the slicing apparatus and/or the loading apparatus to synchronize the transferring of products to the feeding unit with the processing of products by the slicing apparatus.

According to another aspect, the loading apparatus may be movable between a loading position and an operation position, in particular by pivoting the loading apparatus around the horizontal, the vertical and/or an axis orientated parallel to the running direction. E.g., an operator may, manually or via a controller, pivot the loading apparatus before loading products onto the magazine unit and arrange the loading apparatus such that the product support surfaces are oriented horizontally in the loading position. After having filled the magazine unit, the loading apparatus may be rearranged in the operation position, in which the product support surfaces may be inclined to the horizontal, in particular matching an inclination of the feeding unit. Alternatively or additionally, the loading apparatus may be rotated around a vertical axis to enable a flexible loading in dependence on the available space at a certain working area. In general, also more complex but usually guided movements from the operation position to the loading position are possible.

The loading apparatus may be formed as a separate and individual apparatus that may electively be connected to a slicing apparatus. In particular, this may enable a toolless disconnection of the loading apparatus from the slicing apparatus, e.g. to move the loading apparatus for cleaning or to facilitate an access to components of the slicing apparatus for cleaning and/or maintenance work. For example, the loading apparatus may be supported by a trolley or carriage for flexible moving. Alternatively, the loading apparatus may be strictly fastened to the slicing apparatus and/or be a fixed part of the slicing apparatus.

According to another aspect, the loading apparatus may include a weighing device to determine the weight of products loaded onto the magazine unit. In particular, such a weighing device may be used to inform an operator loading products onto the product support surfaces whether the weight of products supplied to the slicer and/or loaded onto the loading apparatus and/or a production line reached the required weight of a certain batch. Thus, unnecessary loading of products onto the loading apparatus may be avoided.

Further, the weight of a subsequent product that is lifted to the transferring height and/or a product at the transferring height may be transmitted to a controller of the slicing apparatus and the controller may be configured to adjust the slicing process in dependence on the product weight. For example, the product may be transferable to a plurality of lanes of the feeding unit and/or to different feeding units in dependence on the product weight, or the number and/or thickness of the slices forming a portion may be determined based on the product weight.

The slicing apparatus may, according to another aspect, further comprise an entraining device that is configured to transfer a product lifted to the transferring height along the transferring direction to the feeding unit. The entraining device may in particular be a part of the loading apparatus. Accordingly, the invention also relates, independently of the slicing apparatus disclosed herein, to a loading apparatus according to any one of the aspects described above with the loading apparatus comprising an entraining device to transfer a product lifted to the transferring height along a transferring direction. The entraining device of such a loading apparatus may be configured according to any one of the aspects described in that which follows in connection with the slicing apparatus.

Thus, the slicing apparatus and in particular the loading apparatus may include an entraining device and products loaded onto the at least one magazine unit may automatically be lifted and transferred to the feeding unit. An operator, hence, only needs to fill the magazine unit with products without having to lift the products or ensure that the products are transferred to the feeding unit, such that a high level of automation with a maximum efficiency may be achieved.

According to another aspect, the endlessly circulating conveying means and the entraining device may be arranged relative to each other such that the product support surfaces, when moving further from the transferring height in the direction of an upper deflection of the conveying means, can move past the entraining device in any position of the entraining device. Thus, independent of the position of the entraining device the product support surfaces may freely move along the running direction. In particular, the entraining device may comprise an entrainer that protrudes towards a product lifted to the transferring height in order to push the product along the transferring direction and the endlessly circulating and the entraining device may be arranged relative to each other such that the product support surfaces may move past the entrainer independently of the position of the entrainer.

Further, in case the loading apparatus comprises a conveying means and a further conveying means with further product supply surfaces, the product support surfaces of the conveying means and the further product support surfaces of the further conveying means may move past the entraining device without touching the entraining device. For example, the entraining device may be positioned above the magazine unit and the conveying means and/or the further conveying means with an entrainer protruding between the two conveying means such that a respective path described by the outer edges of the product support surfaces and the further product support surfaces does not intersect with the entrainer, independent of the position of the entrainer. Hence, independent of the position of the entraining device, products may be lifted and supplied continuously by the magazine unit.

The entraining device may, according to another aspect, be configured to align a product laterally to the transferring direction while moving the product along the transferring direction. In particular, a product transferred to the feeding unit may be moved towards and/or against a lateral border of the feeding unit in order to align the product in the slicing apparatus. This enables to quickly load the products onto the loading apparatus without the requirement of optimum alignment, while the necessary alignment with the slicing apparatus may be achieved automatically during the transfer of the products.

According to another aspect, the entraining device may comprise a driving member that is movable in the transferring direction; at least one entrainer that is arranged on the driving member, the entrainer being configured to engage with the rear end of the product such that the product is movable in the transferring direction; and a drivable alignment means that is configured to align the product at its rear end transversely to the transferring direction.

The entraining device facilitates to automatically transfer supplied products, i.e. products lifted to the transferring height, to the feeding unit of the slicing apparatus, while the products can additionally be aligned transversely to the transferring direction by the alignment means. Hence, the products may be transferred to the feeding unit in an orientation or alignment that provides optimum feeding of the product to the cutting region of the slicing apparatus where the product may be cut into slices.

With the entraining device providing an automatic transfer of a supplied product to the feeding unit in an optimum alignment, the loading as well as the slicing process may be largely automated, accelerated and optimized since the products only need to be loaded quickly onto the loading apparatus, while the transfer to the feeding unit and the alignment is automatically carried out by the entraining device. Thus, the invention also relates independently of its connection to a slicing apparatus and/or a loading apparatus for loading food products onto and/or into a slicing apparatus to an entraining device for transferring supplied food products in a transferring direction to a feeding unit of a slicing apparatus, in particular a highspeed slicer, the entraining device comprising a driving member that is movable in the transferring direction; at least one entrainer that is arranged on the driving member, the entrainer being configured to engage with the rear end of the product such that the product is movable in the transferring direction; and a drivable alignment means that is configured to align the product at its rear end transversely to the transferring direction. The entraining device may further be configured according to any one of the aspects described herein regarding an entraining device as a part of the slicing apparatus and/or the loading apparatus.

In particular, the alignment means may be configured to align the product transversely to the transferring direction simultaneously to the product being moved in the transferring direction by the entrainer. The alignment means may engage with the rear end of the product while the product is moved by the entrainer in the transferring direction, e.g. by a pushing surface of the entrainer that moves in the transferring direction. Due to the movement of the product in the transferring direction, the friction between the product and a surface that supports the bottom side of the product may be reduced such that the entire product may be accurately aligned by applying a transverse force at its rear end.

The feeding unit may comprise a lateral border and the alignment means may be configured to move the product against the lateral border of the feeding unit while the product is transferred to the feeding unit in the transferring direction. Thus, the lateral border may function as a fence ensuring optimum alignment of the products.

In particular, such an entraining device may be used in conjunction with a loading apparatus as disclosed herein. Accordingly, products that are supplied by the loading apparatus at the transferring height may be transferred automatically to the feeding unit by such an entraining device. For example, the entraining device may be arranged above the transferring height with the entrainer extending downwards to push a product lifted to the transferring height in the transferring direction. Alternatively, the entraining device may be arranged laterally of a product lifted to the transferring height. Further, due to the alignment means, it is not necessary to supply the products in an optimally aligned way. Rather, the products may, e.g., be loaded quickly onto the loading apparatus that supplies the products while the required alignment at the feeding unit is accomplished automatically during the transfer of the products to the feeding unit.

According to an aspect, the driving member may comprise an endless member that endlessly circulates between a front deflection and a rear deflection, the at least one entrainer protruding from the endless member. In particular, the endless member may be a toothed belt, a link belt, a chain and/or a conveyor belt.

The at least one entrainer may be connected directly or indirectly to the endless member, e.g. via a mounting. The axes of the deflections may in particular be oriented horizontally and the at least one entrainer may engage with a rear end of a supplied product while protruding from the lower run of the endless member. Alternatively, the endless member may be oriented laterally of a supplied product such that the at least one entrainer may protrude laterally towards the rear end of a supplied product and the axes of the front and the rear deflection may be oriented vertically. Further, the axes of the deflections may also be tilted to the vertical in case the transferring direction is inclined to the horizontal and the entraining device is arranged laterally of a supplied product. In general, the entrainer may protrude perpendicularly from the endless member.

Alternatively to the driving member comprising an endlessly circulating endless member, the driving member may, e.g., comprise a linear motor or a spindle drive to move the at least one entrainer in the transferring direction. While for driving members comprising an endless member, the at least one entrainer may automatically be moved towards the rear end via the run moving against the transferring direction, a linear motor or spindle drive may, e.g., be operated against the transferring direction after having transferred a product to the feeding unit before a new product is supplied. Further, the entraining device may be liftable to enable a motion of the at least one entrainer against the transferring direction while simultaneously supplying a subsequent product.

Further, according to another aspect, the driving member may comprise a linear drive, in particular a toothed belt drive, and the linear drive may be configured to move the at least one entrainer in and/or against the transferring direction.

According to another aspect, the at least one entrainer may include an essentially flat pushing surface. The flat pushing surface may engage with the rear end of a supplied product in order to push and move the product in the transferring direction. The pushing surface may maintain contact with the rear end of the product until the transfer of the product to the feeding unit is completed.

In particular, the entraining device may include two entrainers that are arranged such that whenever the first entrainer reaches the front deflection, the second entrainer arrives at the rear deflection. Hence, when a product has been transferred by the first entrainer and the entrainer reaches the front deflection, the second entrainer is in a position that immediately enables the second entrainer to transfer the next supplied product. The two entrainers may, accordingly, be arranged such that they are always at different runs of the endless member. In addition to enabling an immediate transfer of a subsequent product after a certain product has been transferred to the feeding unit, an arrangement of two entrainers at different runs also ensures that only the entrainer currently transferring a product to the feeding unit is directed towards the product. The other entrainer, instead, is arranged on the respective run moving against the transferring direction pointing away from the products while it is brought back to prepare the transfer of the subsequent product.

According to another aspect, the alignment means may be integrated into the at least one entrainer. Hence, besides a pushing surface, the entrainer may also comprise the alignment means that, in particular, may also engage with the rear end of the product. The alignment means may in particular be integrated in the pushing surface. Further, the contact of the alignment means with the product may be limited to the rear product end such that any possible damage of the product due to this engagement only affects the rear end. However, the rear end is usually not used to produce slices anyway since it commonly exhibits inaccuracies regarding shape and/or size. Further, the feeding unit may include a gripper that grips the product at its rear end in order to guide it towards the cutting region, such that the rear end must be discarded due to the imprints of the gripper. Any minor damages of the rear product end due to the engagement of the alignment means are, hence, tolerable.

The alignment means may, according to another aspect, be drivable through the motion of the driving member and/or the entrainer in the transferring direction. Thus, a movement of the alignment means to apply a transverse force to the product may be derived from the motion of the driving member and/or the at least one entrainer in the transferring direction. Accordingly, a separate driving means for the alignment means may be omitted. Alternatively, the alignment means may comprise or be connected to a driving means that drives the alignment means independently of the driving member and/or the entrainer.

According to another aspect, the alignment means may be drivable through a rack and pinion gear. Through such a rack and pinion gear, a transverse motion to the transferring direction may be derived from the motion of the at least one entrainer and/or the driving member in the transferring direction. In turn, this motion may be transferred to the alignment means in order to align the product.

The alignment means, according to another aspect, may include at least one engagement member that is rotatable via a gear wheel, the gear wheel being moved along the transferring direction and meshing with a rack. In particular, the gear wheel may be connected to the at least one entrainer and jointly move with the entrainer along the transferring direction. The rotation of the gear wheel when meshing with the rack may be transferred to the at least one engagement member, which in particular may engage with the rear end of a supplied product while the product is transferred to the feeding unit. For example, the engagement member may include a gear wheel or an endlessly circulating belt that engages with the rear end of a product that is transferred to the feeding unit. Through the rotation of the engagement member, a force directed transversely to the transferring direction may be transmitted to the product in order to align the product.

The engagement member may comprise a surface with a structure configured to increase the friction between the engagement member and the product. For example, an endless belt forming the engagement member may comprise a profile, teeth and/or knobs to increase the friction between the engagement member and the product. Nevertheless, a sharp surface of the engagement member may be avoided to prevent strong damages of the rear sides of the products that may lead to snippets or fringes during the cutting process.

According to another aspect, the entraining device may include a sensor for detecting supplied products. For example, an optical, a super-sonic and/or a mechanical contact sensor may be provided to detect a supplied product. In particular in case the entraining device is used in conjunction with a loading apparatus as disclosed herein, the sensor may be configured to detect a product that has been lifted to the transferring height. Further, the sensor may be oriented such that a rear end of a supplied product may be detected.

In response to detecting a supplied product, the entraining device may be configured to quickly move the driving member to bring the entrainer into contact with the rear product end and slow down the motion upon detecting that the entrainer engaged with the product. By this procedure, a fast operation may be accomplished while avoiding damages of the products. To detect an engagement with the rear product end, the entrainer may, e.g., include a mechanical contact sensor. Similarly, the sensor may be configured to detect if a product has been completely transferred to the feeding unit such that a further product may be supplied and, e.g., lifted to the transferring height. Also this may be achieved by a mechanical contact sensor integrated into the entrainer. For example, the sensor may maintain contact with the rear product end during the transfer such that a loss of that contact indicates that the product transfer has been completed.

According to another aspect, the entraining device may be a part of a loading apparatus as disclosed herein and the entraining device may be configured to transfer products supplied by the at least one magazine unit to the feeding unit of the slicing apparatus. As has been mentioned, the entraining device may, e.g., be arranged above the magazine unit such that the entrainer may engage with the rear product end from above. Alternatively, the entraining device may be positioned laterally of products at the transferring height.

According to another aspect, a sensor for detecting a product lifted to the transferring height may be provided. In particular, the entraining device may include the sensor for detecting supplied products, i.e. products lifted to the transferring height. The sensor may, e.g., be configured as an optical sensor, an ultra-sonic sensor and/or a mechanical contact sensor in order to detect the product. Based on the information of the sensor, the entraining device may be controlled to start or stop a movement for transferring a product to the feeding unit or to wait for a subsequent product to be lifted to the transferring height.

Further, a controller may be provided that is configured to trigger the entraining device to move the product along the transferring direction in response to a signal of the sensor. Hence, the loading apparatus may be operated entirely automatically with a product lifted to the transferring height automatically being transferred to the feeding unit. Further, the controller may also be configured to interact with a controller of the slicing apparatus or be integrated into a controller of the slicing apparatus. This may facilitate to synchronize the transferring of products to the feeding unit with the operation of the slicing apparatus. For example, the controller may obtain information whether space on the feeding unit is available to receive a product and trigger the entraining device depending on this information and the signal of the sensor.

According to another aspect, the feeding direction may be oriented perpendicular to a plane in which the blade moves, in particular rotates. The feeding direction may be oriented horizontally or inclined to the horizontal, in particular about 20°. The transferring direction in which products may be transferred from the loading apparatus attached to the slicing apparatus to the feeding unit may match the feeding direction. Alternatively, the transferring direction may be oriented horizontally while the feeding direction may be inclined. The loading apparatus may also be movable between an operation position and a loading position, such that product support surfaces onto which the products are loaded may, e.g., be oriented horizontally during the loading of products onto the loading apparatus and parallel to the transferring and/or the feeding direction during operation.

The loading apparatus may be fixed to the slicing apparatus or the loading apparatus may be flexibly connectable to the slicing apparatus. For example, the loading apparatus may be detachable from the slicing apparatus and comprise a trolley or carriage to be easily movable, e.g. to clean the loading apparatus or ease the access to components of the loading apparatus, the slicing apparatus and/or the feeding unit for cleaning or maintenance work.

According to another aspect, the feeding unit may comprise a moving device that is configured to move the products into the cutting region. In particular, the moving device may comprise at least one endlessly circulating conveyor belt that forms a transport surface for the products to be fed into the cutting region, the endlessly circulating conveyor belt circulating along the feeding direction. Thus, a product transferred from the loading apparatus to the feeding unit may, as soon as it reaches the feeding unit, be moved towards the cutting region by the endlessly circulating conveyor belt. The endlessly circulating conveyor belt may be continuously driven during the operation of the slicing apparatus or a controller of the slicing apparatus and/or the feeding unit may be configured to start the circulation of the conveyor belt when a product is transferred to the feeding unit, e.g. by the entraining device. For example, the controller of the slicing apparatus may be configured to start driving the endlessly circulating belt of the moving device of the feeding unit in response to a signal of a sensor that is provided to detect a product that has been lifted to the transferring height. The endlessly circulating belt of the moving device may in particular be synchronized with the operation of an entraining device.

As an alternative to the moving device comprising at least one endlessly circulating belt, the moving device may comprise a sliding surface and a pushing and/or gripping member for moving the products over the sliding surface into the cutting region. For example, the moving device may comprise a product gripper that grips a product having been lifted to the transferring height and/or having been transferred to the feeding unit at its rear end to feed the product into the cutting region. The product gripper may be moved in and/or against the feeding direction by a linear drive. In particular, the product gripper may also, besides guiding the product into the cutting region, be used to transfer a product that has been lifted to the transferring height to the feeding unit. As such, the product gripper may be movable against the feeding direction up to the entrance side of the loading apparatus at which products may be loaded onto the loading apparatus, such that the product gripper may be configured to engage with a rear product end of a product that has been lifted to the transferring height while the product is still located onto the uppermost product support surfaces. By moving the product gripper towards the cutting region, the product may be transferred to the feeding unit as well as guided into the cutting region by the product gripper. The product gripper may comprise at least one claw and/or hook to engage with a rear product end or the product gripper may be configured as a vacuum gripper to control the feeding of the products into the cutting region. Further, the product gripper may be configured to engage with an upper side of the products and grip the products from above while feeding the products into the cutting region.

According to another aspect, the moving device may comprise a transporting member that is configured to apply a pressure onto an upper product side while the product is fed into the cutting region. In particular, the product may be clamped between a transport surface of the feeding unit and the transporting member while being fed into the cutting region to enable a controlled feeding of the products into the cutting region. Thus, forces transmitted by the blade during the cutting of the products may be prevented from affecting the alignment of the product in the feeding unit and a correct alignment of the products during the entire slicing process, in particular an alignment parallel to the feeding direction, may be ensured.

The transporting member may comprise at least one rotatable element that is rotatable in the feeding direction. The at least one rotatable element may be rotatable around a rotation axis that is oriented perpendicular to the feeding direction and in a plane that is parallel to the feeding direction. In particular, such a rotatable element may engage with the upper product side to provide a pressure towards a transport surface of the feeding unit without hindering the movement of the products into the cutting region. For example, the transporting member may comprise at least one roller, in particular two rollers, that is or are configured to rotate along the feeding direction in order to stabilize the products that are fed into the cutting region. In particular, the transporting member may collaborate with at least one endlessly circulating conveyor belt that forms a transport surface for the products while feeding the products into the cutting region. Further, the at least one roller may also be driven, in particular synchronously with the endlessly circulating belt, to move the products into the cutting region. The rotatable element, in particular the roller, may comprise a structured, in particular toothed, surface to engage with the upper product side while moving the product towards the cutting region. Alternatively or additionally to a roller, the transporting member may comprise at least one endlessly circulating belt engaging with the upper product side while feeding the product into the cutting region, the endlessly circulating belt in particular providing a toothed surface for engaging with the upper product side. In principle, the rotating member may also be used to move the products towards the cutting region over a sliding surface of the feeding unit.

The at least one rotatable element may, according to another aspect, be movable perpendicularly to the feeding direction. In particular, the rotatable element may be movable in the running direction. This enables to variate the height of the rotatable element relative to a transport surface of the feeding unit onto which the products are fed into the cutting region in order to match this height with a respective size of the product that has been transferred to the feeding unit.

For example, the rotatable element may be configured to be moved perpendicularly to the feeding direction and/or in the running direction by a product that is and/or has been transferred to the feeding unit. In particular, a product that is moved in the feeding direction and/or the transferring direction by a moving device of the feeding unit and/or an entraining device may, when reaching the rotatable element with a front product end, transmit a force to the rotatable element, thus forcing the rotatable element to evade above the product until it reaches the upper product side. For example, the rotatable element may rotate along a front side of a product that is transferred to the feeding unit until it reaches the upper product sides to engage with the upper product side and provide a pressure towards the transport surface while the product is fed into the cutting region.

In particular, the movement of the rotatable element perpendicular to the feeding direction may occur passively. Thus, the rotatable element may be displaceable by the product that is moved in the feeding direction against the pressure the rotatable element transmits towards a transport surface of the feeding unit. As soon as the rotatable element reaches the upper side of the product, the rotatable element rotates along this upper side while constantly providing a pressure towards the transport surface. Further, the rotatable element automatically follows an eventual structure of the upper side of the product. Alternatively, a controller of the slicing apparatus and/or the feeding unit may be configured to adjust the rotatable element to a height corresponding to the size of a product to be transferred to the feeding unit from the loading apparatus. For example, a signal of a sensor that is configured to detect a product that has been lifted to the transferring height by the loading apparatus may be used to infer the products size and adjust the position of the rotatable element and/or the transporting member accordingly. Further, the slicing apparatus may comprise a measuring device to infer the product dimensions. wherein the measuring device may e.g. comprise optical sensors, a camera, a scanner and/or a weighing device to determine certain attributes of the products.

According to another aspect, the moving device may comprise at least two endlessly circulating conveyor belts for moving the products into the cutting region, with the conveyor belts being arranged consecutively in the feeding direction. Each of the conveyor belts may form a respective transport surface for the products, such that a product that is fed into the cutting region may be transferred from a first endlessly circulating conveyor belt to a second endlessly circulating conveyor belt in the feeding unit. In particular, a transporting member comprising two rotatable elements with each of the rotatable element corresponding to one of the circulating conveyor belts may be provided, such that the products may be clamped between a respective rotatable element and the corresponding conveyor belt while being fed into the cutting region. Thus, the products may be stabilized during the entire feeding into the cutting region.

According to another aspect, the feeding unit may comprise a trimming cutter to cut off a part of the product during the feeding into the cutting region, in particular before the product is cut into slices in the cutting region. In particular, the trimming cutter may be configured to and/or arranged to cut the products along the feeding direction. For example, the trimming cutter may comprise a blade, in particular a circular blade, rotating in or against the feeding direction to cut off a part of the product.

By providing such a trimming cutter, the products may, e.g., be cut into several parts that are fed into the cutting region in order to simultaneously produce several, e.g. two, portions of slices with predefined dimensions, in particular with a single blade. Thus, the trimming cutter to some extent may be used to increase the number of lanes in which slices are simultaneously produced by longitudinally dividing the products fed into the cutting region.

Further, the trimming device may be used to cut off a part of the product that is not suitable as a part of the slices that are produced. E.g., a fat margin of a product may be cut off in order to prevent the production of slices with a large part consisting mostly of fat. The trimming device may be adjustable perpendicularly to the feeding direction and in a plane parallel to the feeding direction to determine the size of the part that is cut off by the trimming device. Thus, the trimming may be adjusted to a certain product, in order to remove only a minimum part of the product that is not usable for the further processing. The part to be removed may, e.g., be derived by a measuring and/or scanning device, which may in particular comprise a camera to derive the product contour and/or structure. Further, the size of the slices may be defined by cutting off a certain part of the products by the trimming device.

According to another aspect, a selection gap for sorting out a part of the product may be formed in the feeding unit. In particular, the feeding unit may comprise a moving device with a first conveyor belt and a second conveyor belt and the belt transition may be used as a selection gap for sorting out product parts that are not usable and need to be removed. Alternatively, such a gap may be provided between two parts of a sliding surface onto which the products are fed into the cutting region. For example, the selection gap may be arranged subsequently to a trimming device that cuts of a part of a product that is fed into the cutting region. Thus, this part of the product, which should be removed before cutting the products into slices, may automatically fall through the selection gap. Below the selection gap, a collection area may be provided to collect the unusable part. E.g., the slicing apparatus may be provided with a space below the selection gap where a movable box is arranged, such that the unusable parts may easily be collected and disposed after several products have been processed and the box has been filled.

Further, the slicing apparatus may comprise a scanning device to infer information concerning the products that are fed into the cutting region. In particular, the scanning device may be arranged at a selection gap formed by the feeding unit. For example, the scanning device may comprise a camera and/or one or several illumination sources, in particular LED, to illuminate the product through the selection gap and determine the product contour, the products size and/or the product weight. Based on the product contour, the weight may in particular be estimated assuming a constant product density. The scanning device may comprise at least a first camera and/or a first LED and a second camera and/or a second LED, with the first camera and/or the first LED being arranged below the selection gap and the second camera and/or the second LED being arranged above the selection gap. In addition, a further camera and/or LED may be provided to analyze the front and/or the rear end of the product, in particular its contour. Thus, the scanning device may be configured to determine the entire product dimensions, which in particular may be used to infer the product weight.

The slicing apparatus may, according to another aspect, comprise a controller for controlling the slicing process. In particular, the controller may comprise or be configured as a microprocessor and/or a CPU. Further, the controller of the slicing apparatus may be configured to control the lifting of the products with the loading apparatus and/or the operation of the entraining device, as has been mentioned above. Alternatively, separate controllers for the loading apparatus and/or the entraining device may be provided, wherein the controllers may each comprise or be configured as a microprocessor and/or a CPU. In addition, the controller of the slicing apparatus may comprise a display for displaying information concerning the slicing process that may be checked by an operator supervising the slicing process. The display may be configured as a touchscreen via which the operator may enter commands and/or choose between different slicing programs. Alternatively or in addition, the controller may include several buttons via which commands may be entered to control the slicing process. For example, the number of slices per portion, the thickness of the slices and/or the weight of the portions may be settable.

The blade for cutting the products into slices may in particular be configured as a circular blade or as a crescent blade. Further, the slicing apparatus may provide a collecting unit for collecting the slices cut off the products and for building the portions. The collecting unit may comprise a conveying means, in particular an endlessly circulating belt, to transfer a completed portion to further processing steps, e.g. a packaging machine. In addition, the belt and/or the collecting unit may be moved during the cutting of the slices in order to form a shingled portion. In particular, the belt and/or the collecting unit may be movable towards and/or away from the blade and/or laterally with respect to the blade. The slicing apparatus may be configured to perform at least one blank cut, i.e. a rotation of the blade without cutting off a slice of the product. In particular, such a blank cut may enable to remove a completed portion from the collecting unit without the subsequent slice interfering with the portion transport. For example, the blade may be movable and/or the slicing apparatus and/or the feeding unit may be configured to halt the feeding of the product in order to perform a blank cut. Alternatively, the slicing apparatus may be configured to continuously cut products into slices, e.g. in order to cut a product into a single portion of slices.

The slicing apparatus may comprise a pressing member that is configured to press a front part of the products towards a surface of the feeding unit and/or a cutting edge while the product is cut into slices. The pressing member may stabilize the product and in particular its front part during the slicing to prevent the product from moving due to forces supplied by the blade. The cutting edge may constitute a border of the feeding unit over which the products are fed to be cut by the blade. In particular, the thickness of the slices may be equal the length by which the products overreach the cutting edge during the cutting. Accordingly, the slicing frequency may depend on the thickness of the slices since the time between two consecutive cuts must be sufficient to advance the product by the selected slice thickness.

The pressing member may be movable by a lambda kinematic that is configured to move the pressing member essentially parallel to a cutting plane in which the blade of the slicing apparatus moves. With such a lambda kinematic, a distance between the pressing member and the blade or the cutting plane may be kept constant independent of the position of the pressing member. Thus, the slicing apparatus may be used to process a variety of products with different heights while any product can securely be stabilized by the pressing member. Accordingly, a constantly high cutting quality may be ensured independent of the dimensions of the food products to be processed. In particular, this is also relevant if only products of one type, e.g. only bacon, is cut by the slicing apparatus due to the natural variation of the dimensions and/or the shape of food products.

Hence, such a pressing member being movable by a lambda kinematic enhances the flexibility of a slicing apparatus regarding the variety of product types or sizes that may be processed without affecting the cutting quality. Thus, independently of the loading apparatus and the entraining device disclosed herein, the invention also relates to a pressing member that is movable by a lambda kinematic and configured to stabilize a product while slices are cut off the product in a cutting region of a slicing apparatus. In particular, the pressing member may comprise a pressing roll that is configured to engage with an upper side of a product during the cutting, wherein the pressing roll may in particular rotate freely. Further, the invention also relates to a slicing apparatus comprising such a pressing member.

Figure 5B:
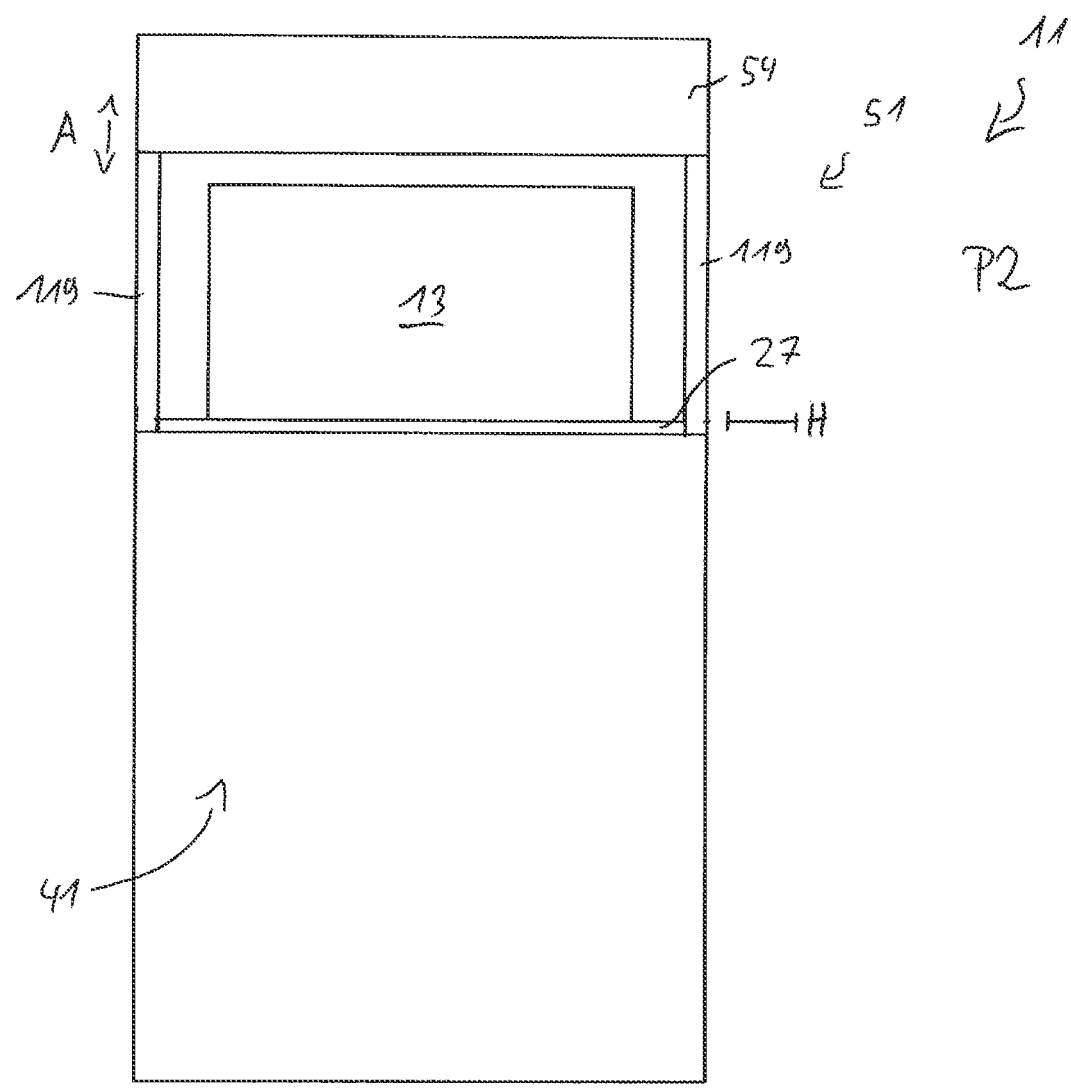
Figure 7:
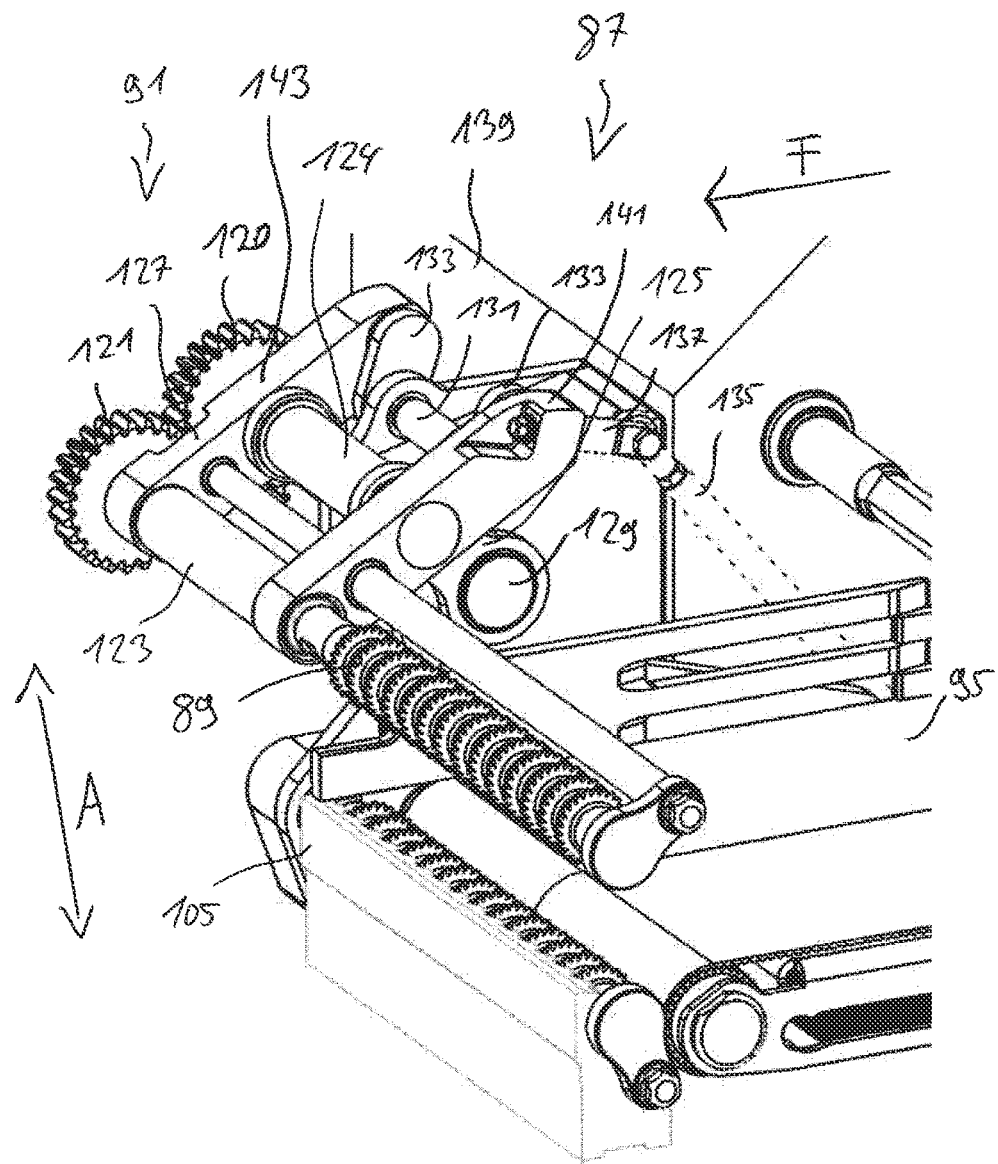
Figure 7C:
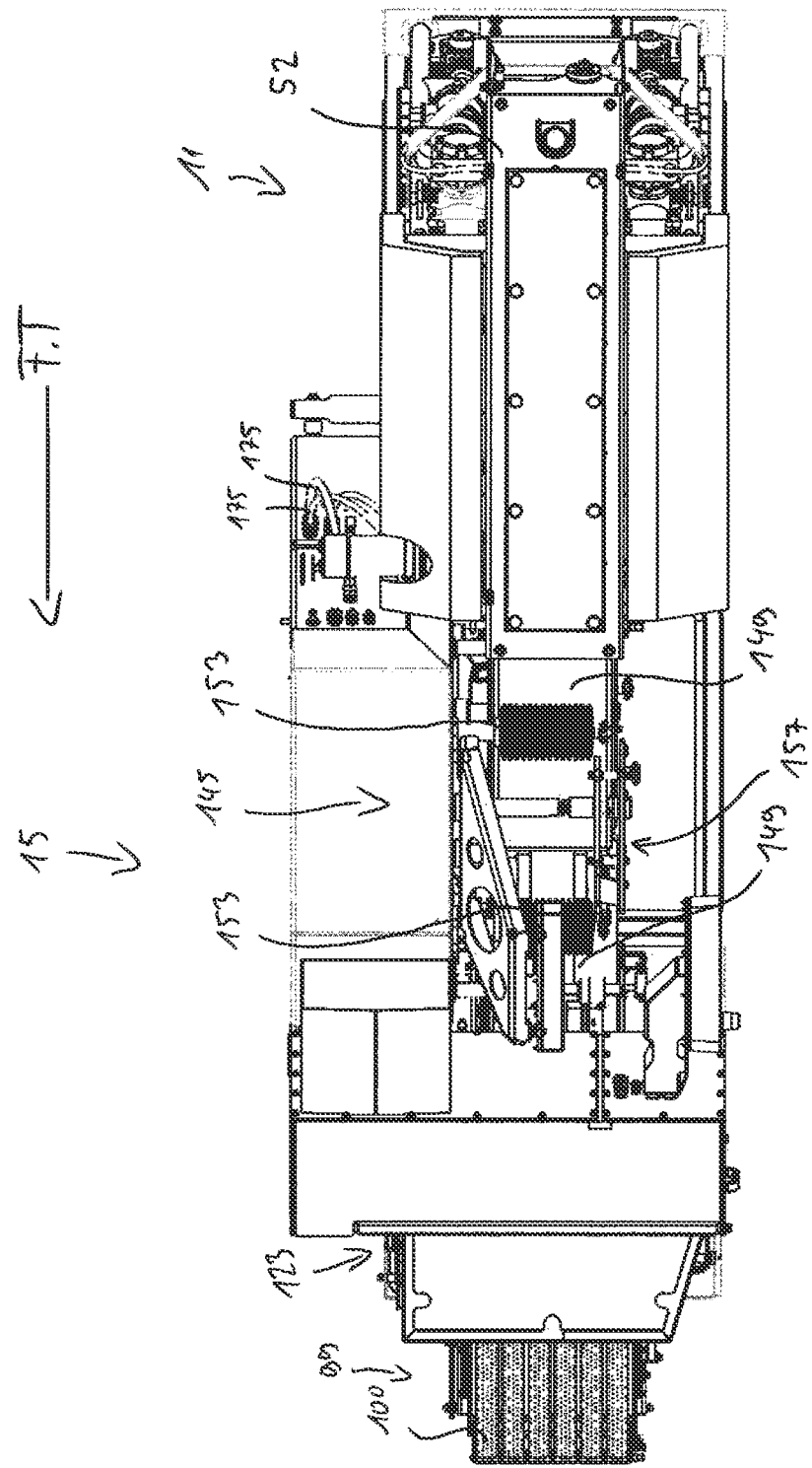
Figure 8D:
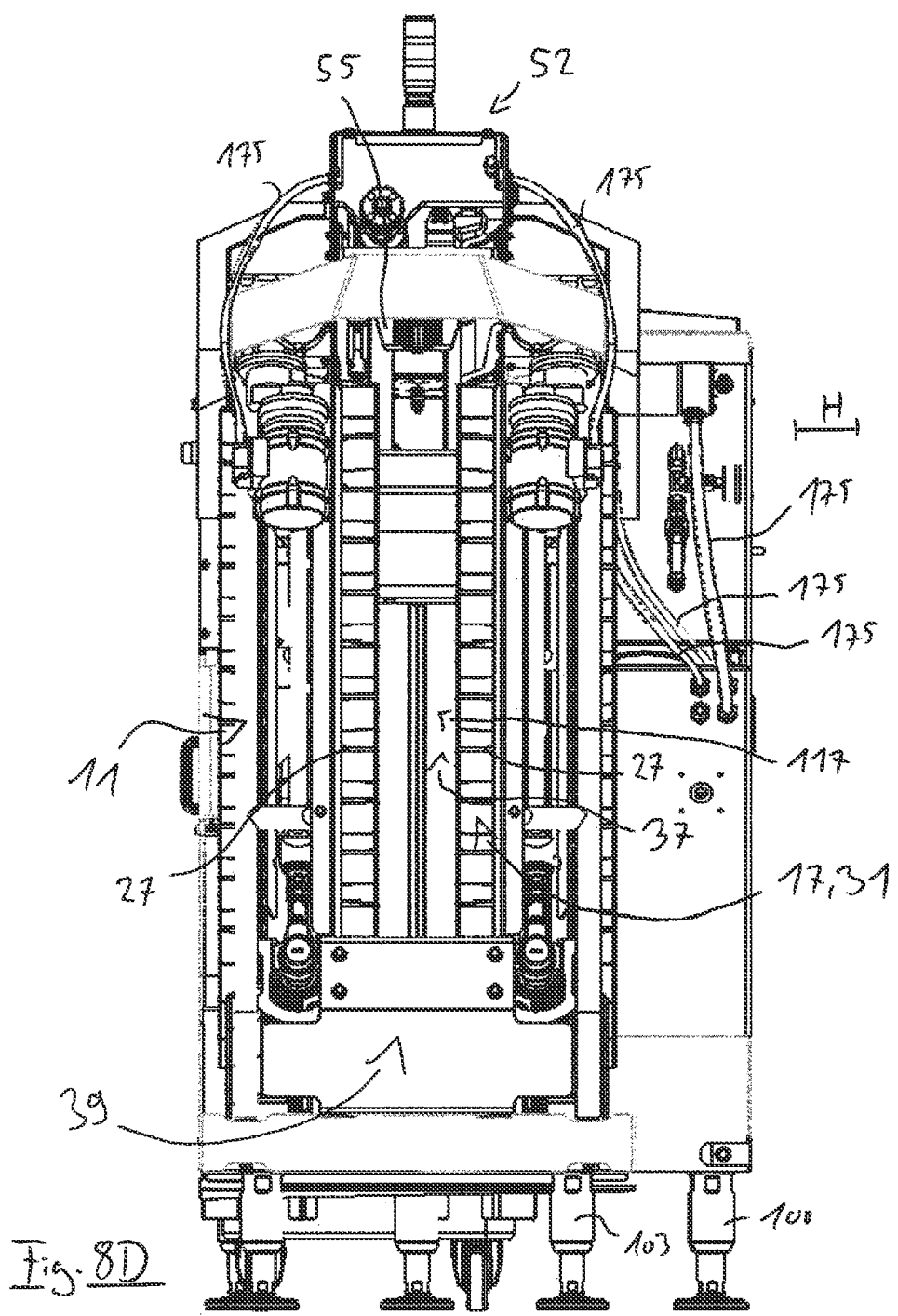

Exemplary embodiments and functions of the present disclosure are described hereinafter in conjunction with the following drawings, showing:

FIGS. 1A and 1B a respective schematic depiction of a slicing apparatus with a loading apparatus, the loading apparatus being arranged in an operation position and in a loading position, respectively, FIGS. 2A and 2B a respective schematic depiction of the loading apparatus as viewed from an entrance side of the loading apparatus, FIGS. 3A and 3B a respective schematic depiction of a further embodiment of the loading apparatus as viewed from the entrance side, FIG. 4 a perspective depiction of an entraining device that may be used in conjunction with the loading apparatus, FIGS. 5A and 5B a respective schematic depiction of a blocking member of the loading apparatus as viewed from an exit side of the loading apparatus, FIG. 6 a schematic depiction of a further embodiment of the loading apparatus as viewed from the entrance side, FIG. 7 a perspective depiction of a pressing member of the slicing apparatus, and FIG. 8A to 8E respective depictions of a further slicing apparatus with a loading apparatus, from both sides, from above, from the rear and from the front.

FIG. 1A shows a slicing apparatus 15 with a feeding unit 21 onto which three abut-ting products 13 are loaded and fed to a cutting region 23. In the cutting region 23, into which the products 13 are advanced over a cutting edge 105, a blade 83 is arranged and cuts the products 13 into slices 25. The feeding unit 21 comprises a conveying means 95, which is configured as a belt conveyor that endlessly circulates between two pulleys 97 and transports the products 13 in a feeding direction F towards the cutting region 23. The feeding direction F is inclined to the horizontal at an angle of approximately 20° and oriented perpendicular to a slicing plane that is defined by the motions of the blade 83 during the cutting process. For example, the blade 83 may be rotating in the cutting plane. In particular, the slicing apparatus 15 may be configured as a high-speed slicer.

The slices 25 that have been cut off the products 13 are collected at a collecting unit 99, at which a portion 107 comprising several stacked or shingled slices is formed. The collecting unit 99 comprises a conveying means 100 that is configured as a belt conveyor onto which the slices 25 fall. The conveying means 100 is movable between two pulleys 97, such that a complete portion 107 may be automatically transferred to further processing steps, e.g. to a packaging machine (not shown in the Figure). Further, the conveying means 100 may be actuated during the collection of the portion 107, e.g. in order to arrange the falling slices 25 in a shingled portion 107.

By feeding the products 13 in the inclined feeding direction F to the cutting region 23, the arrangement of the slices 25 to portions 107 may be improved since the fall of the slices 25 may be better controlled. However, in order to stabilize the products 13 during the cutting process, the slicing apparatus 15 comprises a pressing member 87 that presses the products 13 in a front part against the cutting edge 105. This enables to hold the products 13 while the blade 83 cuts off a slice 25 to prevent the products 13 from moving due to the forces transmitted by the blade 83. An embodiment of the pressing member 87 is shown in FIG. 7.

As shown in FIG. 7, the pressing member 87 may comprise a pressing roll 89 that is arranged above the cutting edge 105 in order to press products 13 conveyed by the conveying means 95 against the cutting edge 105. The pressing role 89 is freely rotatable around an axis 123 and connected to a frame 127. The frame 127 is suspended at its rear end 141 from a structure 139 with two respective guiding arms 133, which are pivotable around an axis 131 that is fixed at the structure 129. The rear end 141 of the frame 127 is hinged to the guiding arms 133, enabling the frame 127 to pivot around the rear end 141. Further, a middle section 143 of the frame 27 is rotatable around an axis 124 that is suspended from the structure 139 with an arm 125. The arm 125 is pivotable around an axis 129.

In order to press a product 13 towards the cutting edge 105, the pressing roll 89 is movable perpendicularly to the feeding direction F as indicated by the arrow A. To move or adjust the pressing role 89, the rear end 141 of the frame 127 may be actuated by a driving rod 135 that is connected to the rear end 141 via a connection 137. The connection 137 is rigidly fixed at the frame 127 but pivotable with respect to the driving rod 135. When the driving rod 135 is extended, the rear end 141 of the frame 127 is moved and guided along a circle around the axis 131 by the guiding arms 133. Further, the middle section 143 of the frame 127 rotates around the axis 124 during the movement, while the axis 124 is additionally pivoted around the axis 129.

The length of the guiding arms 133, the length of the arm 125 and the distance between the rear end 141 and the middle section 143 of the frame 127, respectively the distance between the rear end 141 and the axis 124, is chosen such that the pressing member 87 is configured as a lambda kinematic 91. Thus, the pressing roll 89 moves linearly and perpendicularly to the feeding direction F and the pressing roll 89 always maintains the same distance from the blade 83, in particular from a cutting plane defined by the movement of the blade 83, independent of the position of the pressing member 87. This enables to process a variety of products 13 and in particular natural food products 13 with varying sizes or heights while always applying an optimum pressure with the pressing member 87 to stabilize the products 13 while cutting off slices 25. In particular, the pressing member 87 may be used in conjunction with a slicing apparatus 15 used for cutting bacon loafs into slices, in particular North American streaky bacon and/or turkey bacon, to absorb the strong forces generated during the cutting.

In addition, the axis 124 is connected to a gear wheel 120 that meshes with a gear wheel 121 connected to and rotatable around the axis 123. The gear wheel 120 meshes with a further gear wheel that is arranged in axial alignment with the axis 129 but not visible in FIG. 7. The radius of the further gear wheel matches the length of the arm 125, such that the gear wheel 120, the gear wheel 121 and the further gear wheel always remain in mesh during the movement of the pressing member 87 and independent of the position of the pressing member 87.

Referring to FIG. 1A again, it is shown that a loading apparatus 11 is connected to the slicing apparatus 15 and its feeding unit 21 at the rear end of the slicing apparatus 15 regarding the feeding direction F. The loading apparatus 11 comprises a magazine unit 17 that forms a store 31 for a plurality of products 13. The products 13 stored in the magazine unit 17 may be lifted to a transferring height H by a conveying means 19 that endlessly circulates along a running direction R (refer also to FIGS. 2A to 3B and 6 for the conveying means 19).

Above a product 13 lifted to the transferring height H, an entraining device 55 is arranged that is configured to transfer the product 13 to the feeding unit 21 in a transferring direction T, which matches the feeding direction F. Hence, the products 13 stored in the magazine unit 17 can automatically be lifted and transferred to the feeding unit 21, such that products 13 do not need to be loaded manually to the feeding unit 21. In particular, this enables an operator supervising the product processing to load products 13 onto the loading apparatus 11 at a comfortable height without having to lift the products 13 to the feeding unit 21. Further, with the possibility to store a plurality of products 13 in the magazine unit 17, the operator may handle several slicing apparatuses 15 or fulfil additional tasks without the risk of a break in the product processing due to the slicing apparatus 15 running out of supplied products.

From the conveying means 19, which is not visible in FIGS. 1A and 1B but shown in FIGS. 2A to 3B and FIG. 6, several product support surfaces 27 protrude that are oriented essentially perpendicular to the running direction R and spaced apart from each other. The products 13 stored in the magazine unit 17 are loaded onto a respective product support surface 27, such that a product support surface 27 and an adjacent product support surface 27 form a compartment 117 for a product 13. Thus, the store 31 comprises several compartments 117 to store a plurality of products 13 that can be lifted simultaneously. In addition, the loading apparatus 11 comprises a blocking member 51 that prevents products 13 that are below the transferring height H from moving in the transferring direction T, thus closing the compartments 117 below the transferring height H at an exit side 41 of the loading apparatus 11 via which products 13 lifted to the transferring height H are transferred to the feeding unit 21.

To automatically transfer products 13 that have been lifted to the transferring height H to the feeding unit 21 of the slicing apparatus 15, the entraining device 52 comprises a driving member 53. The driving member 53 comprises an endless member 61, e.g. an endless belt, a toothed belt, a link belt or a chain, that endlessly circulates between a front deflection 63 and a rear deflection 65 along the transferring direction T. Hence, the driving member 53 may be configured as a linear drive, in particular a toothed belt drive. From the endless member 61, two entrainers 55 protrude that each comprise a respective pushing plane 67 oriented essentially perpendicular to the endless member 61 and configured to engage with a rear end 57 of the products 13. Thus, by the movement of the endless member 61 in the transferring direction T, the product 13 at the transferring height H is pushed to the feeding unit 21 by the engaging entrainer 55. Further, the entrainers 55 are arranged such that whenever one entrainer 55 reaches the front deflection 63 and completes the transfer of the respective product 13 to the feeding unit 21, the other entrainer 55 arrives at the rear deflection 65 and immediately is in the position to transfer a product 13 subsequently lifted to the transferring height H by the loading apparatus 11.

In order to accomplish an immediate and automatic transfer of a product 13 that has been lifted to the transferring height H, the entraining device 52 and/or the loading apparatus 11 may comprise a sensor 77 that is configured to detect a product 13 at the transferring height H (see also FIGS. 2A to 3B and 6). The sensor 77 can be connected to a controller 81 of the entraining device 52 that is configured to trigger the entraining device 52 to move a product 13 in the transferring direction T in response to a signal of the sensor 77 indicating that the product 13 has been supplied. The controller 81 may also be connected to a controller of the slicing apparatus 15 in order to synchronize the transfer of products 13 from the loading apparatus 11 to the feeding unit 21 with the operation of the slicing apparatus 15. For example, an optical sensor, a super-sonic sensor and/or a mechanical contact sensor may be used as the sensor 77 in order to detect the product 13 at the transferring height H. Further, a mechanical contact sensor may be integrated into the entrainer 55 to detect a contact between the entrainer 55 and the rear end 57 of the product 13. This enables to also detect when a product 13 has been transferred to the feeding unit 21 indicated by a missing contact to the respective entrainer 55. For example, this information may be used as a start signal to lift the subsequent product 13 to the transferring height H.

While the loading apparatus 11 is shown in its operation position O in FIG. 1A in which the product support surfaces 27 are arranged parallel to the feeding direction F, the loading apparatus 11 is movable to a loading position L in which products 13 may be loaded onto the loading apparatus 11. To move the loading apparatus 13 from the operation position O to the loading position L, a frame 85 of the loading apparatus 11 may be pivoted around a switching axis S. As can be seen in FIG. 1B, the product support surfaces 27 are oriented horizontally in the loading position L and products 13 may be loaded to the loading apparatus 11 via an entrance side 39 that opposes the exit side 41 regarding the transferring direction T. Thus, the entrance side 39 constitutes a handling side for an operator to supply products 13 to the slicing apparatus 15.

Besides a manual loading of the loading apparatus 11, automatic and simultaneous loading of a plurality of products 13 onto the loading apparatus 11 may also be provided. E.g., products 13 may be supplied by a wagon that features a similar di-vision into compartments as the magazine unit 17, such that the products 13 may be transferred automatically to the loading apparatus 11 in its loading position L.

Further, the loading apparatus 11 may comprise a weighing device in order to determine the weight of products 13 that have been loaded onto the loading apparatus 11. For example, the weighing device may provide a signal to stop the product loading once the necessary weight of a certain batch has been reached to prevent unnecessary loading of products 13.

The loading apparatus 11 is configured as a separate unit and comprises a base 103 that is movable relative to a base 101 of the slicing apparatus 15. Thus, the loading apparatus 11 may be moved relatively to the slicing apparatus 15, e.g. to clean the loading apparatus 11 or to provide access to components of the slicing apparatus 15 and in particular the feeding unit 21, e.g. for cleaning or maintenance work. To ease the moving of the loading apparatus 11, the loading apparatus 11 may also comprise a trolley or carriage with wheels as a base 103.

FIGS. 2A and 2B depict a first embodiment of the loading apparatus 11 as viewed from the entrance side 39 from which products 13 may be loaded. In this embodiment, a conveying means 19 and a further conveying means 33 are provided that each comprise a respective endless member 29. The endless members 29 endlessly circulate along the running direction R in a counter-rotating way between a lower deflection 80 and an upper deflection 79. Thus, respective first runs 113 of the conveying means 19 and the further conveying means 33 that are opposing each other move upwards to form a lifting area 111 of the magazine unit 17.

Several product support surfaces 27 protrude essentially perpendicular to the running direction R from the endless member 29 of the conveying means 19. The product support surfaces 27 may be directly or indirectly fastened to the endless member 29, which may in particular be an endless belt, a link belt or a chain. The product support surfaces 27 may be detachably connected to the endless member 29, such that product support surfaces 27 optimally adjusted to a certain type of products 13 may be used. For example, product support surfaces 27 of different sizes and/or surface structures may be connected to the endless member 29 in dependence on the respective products 13 to be processed.

Similarly, the further conveying means 33 comprises several further product support surfaces 35 that protrude essentially perpendicular to the running direction R from the respective endless member 29 and that can be detachably mounted. The number of product support surfaces 27 equals the number of further product support surfaces 35. The product support surfaces 27 and the further product support surfaces 35 that are arranged on the respective first runs 113 of the conveying means 19 and the further conveying means 33 oppose each other and are located at the same height regarding the running direction R. Thus, the product support surfaces 27 and the further product support surfaces 35 point towards each other in the lifting area 111 of the magazine unit 17.

The product support surfaces 27 arranged at the first run 113 jointly form a respective product support 37 with a corresponding further product support surface 35, the opposing further product support surface 35, in the lifting area 111. As can be seen in FIG. 2B, products 13 may be loaded onto the respective product supports 27 with the bottom side of the products 13 partly being supported by the product support surface 27 and by the corresponding further product support surface 35. Further, adjacent product supports 37 and the inner runs 113 of the endless members 29 form the compartments 117 of the store 31 for the products 13, wherein the compartments 117 below the transferring height H are closed by the blocking member 51 (see FIGS. 1A, 1B, 5A and 5B). The uppermost compartment 117 at the transferring height H is only formed by the uppermost product support 37 and the opposing runs 113, such that products 13 at the transferring height H may be transferred to the feeding unit 21.

The endless member 29 of the conveying means 19 and the endless number 29 of the further conveying means 33 circulate along the running direction R in a counter-rotating way and the respective inner runs 113 that are opposing each other move upwards to lift the products 13 that are loaded onto the product supports 37. Accordingly, the respective outer runs 115 of the endless members 29 move downwards towards the lower deflection 80 to form a subsequent product support 37 once the product 13 at the transferring height H has been transferred to the feeding unit 21 and the subsequent product 13 is lifted to the transferring height.

For each of the conveying means 19 and the further conveying means 33, a corresponding driving means 43 respectively 45 is provided. In the schematic depictions, the driving means 43 and 45 drive the lower deflections 80, while it is also possible to drive the upper deflections 79. The driving means 43 and 45 are operated in a synchronous way such that both endless members 29 move at the same speed and the product support surfaces 27 and the further product support surfaces 35 jointly forming a product support 37 always maintain at the same height relative to each other to lift the products 13 to the transferring height H. Alternatively, a common drive for the conveying means 19 and the further conveying means 33 may be provided with a clutch ensuring a synchronous movement.

In the upper part of the loading apparatus 11, a pressing member 47 is arranged that is configured to push a product 13 that is lifted to the transferring height H against a lateral border 49 of the loading apparatus 11. In particular, the pressing member 47 may engage at a front end of the product 13 to prevent the product 13 from sliding in the transferring direction T. The pressing member 47 may be movable, e.g. liftable, to unblock a path of the product support surfaces 27 from the transferring height H onwards around the upper deflection 79. Further, the pressing member 47 may be arranged such that the path of the product support surfaces 27 does not intersect with the pressing member 47 independent of its position.

Further, a sensor 77 is provided to detect the product 13 that has been lifted to the transferring height H. In the embodiment shown in FIGS. 2A and 2B, no entraining device 52 is provided such that a product 13 lifted to the transferring height H may, e.g., be pushed to the feeding unit 21 manually. Alternatively, a further means for automatic transfer of the product 13 to the feeding unit 21 may be provided. For example, the slicing apparatus 15 may comprise a product gripper that is movable as far as the entrance side 39 of the loading apparatus 11 to grip a product 13 at the transferring height H, transfer the product 13 to the feeding unit 21 and/or guide the product 13 towards the cutting region 23. For example, such a product gripper may be moved upon receiving a signal from the sensor 77.

Alternatively or in addition to the pressing member 47, the blocking member 51 may be movable between a blocking position P1 and a release position P2 in order to prevent an unintentional sliding of a product 13 lifted to the transferring height towards the feeding unit 21, wherein a motion of a product 13 at the transferring height H may be prevented in the blocking position P1 and enabled in the release position P2 as depicted in FIGS. 5A and 5B. FIG. 5A shows a schematic view of the loading apparatus 11 from the exit side 41. The blocking member 51 is arranged as a closed wall or sheet metal up to the transferring height H, where the blocking member 51 comprises a barrier 54. The barrier 54 is movable perpendicularly to the transferring direction T along two rods 119 as indicated by an arrow A. In the blocking position P1, the barrier 54 is positioned in front of the lower part of the product 13 that has been lifted to the transferring height H, thus blocking a movement of the product 13 in the transferring direction T. However, the barrier 54 may be lifted to the release position P2 shown in the FIG. 5B to open the passage for the product 13 to the feeding unit 21. Hence, after transferring the blocking member 51 to the release position P2 by lifting the barrier 54, the product 13 located at the transferring height H may be transferred to the feeding unit 21. After the product transfer, the blocking member 51 may be reset to its blocking position P1 before lifting the subsequent product 13 to the transferring height H.

FIGS. 3A and 3B schematically illustrate a further embodiment of the loading apparatus 11 as viewed from the entrance side 39. Similarly to the loading apparatus 11 shown in FIGS. 1A and 1B, an entraining device 52 is arranged above the magazine unit 17 and configured to automatically transfer products 13 at the transferring height H to the feeding unit 21. The entraining device 52 is fastened to the frame 85 of the loading apparatus 11 by a fastening means 109 and includes a sensor 77 that is configured to detect a product 13 at the transferring height H. The sensor 77 is connected to a controller 81 of the entraining device 52 that is configured to trigger the entraining device 52 to transfer a product 13 to the feeding device 21 of the slicing apparatus 15 upon receiving a signal from the sensor 77 confirming that a product 13 has been lifted to the transferring height H.

As can be seen in FIG. 3A, the entraining device 52 comprises an entrainer 55 that protrudes from an endless member 61. The entrainer 55 comprises a flat pushing surface 67 that engages with the rear end 57 of the product 13 that has been lifted to the transferring height H in order to push the product 13 towards the feeding unit 21 in the transferring direction T. In addition, an alignment means 59 is integrated into the entrainer 55 that is configured to align the product 13 at the rear end 57 transversely to the transferring direction T. In order to accomplish this, the alignment means comprises two engagement members 71 that engage with the rear end 57 of the product 13. By these engagement members 71, the product 13 may be aligned transversely to the transferring direction T while the product 13 is moved by the entrainer 55 in the transferring direction T.

A possible embodiment of the entraining device 52 is shown in detail in FIG. 4. In this embodiment, the endless member 61 of the entraining device 52, which endlessly runs in the transferring direction T between a front deflection 63 and a rear deflection 65, is configured as a link belt from which the entrainer 55 protrudes. The alignment means 59 is drivable through a rack and pinion gear 69 and, thus, through the motion of the entrainer 55 in the transferring direction T.

The engagement members 71 are configured as two gear wheels that are driven by a gear wheel 73 that meshes with a rack 75 while the entrainer 55 moves in the transferring direction T. Thus, through the motion of the entrainer 55, the engagement members 71 may be rotated and, by the contact with the rear end 57 of the product 13, transfer a force that is directed transversely to the transferring direction T to the rear end 57 of the product 13. Alternatively, the engagement members 71 may, e.g., be configured as an endless belt that engages with the rear end 57 of the product 13 and that is drivable through the rack and pinion gear 69. In general, also a separate driving means to drive the alignment member 59 may be provided.

Since the alignment means 59 engages with the product 13 during the movement of the product 13 in the transferring direction T, frictional forces between the bottom side of the product 13 and the product support 37 are reduced. Thus, the entire product 13 may be aligned by supplying only minor forces to the rear end 57 and damages of the product 13 due to the aligning may be prevented. In particular, the product 13 may be moved against a lateral border of the feeding unit 21 to ensure that every product 13 is fed to the cutting region 23 and cut at a correct lateral position.

As further shown in FIG. 3B, the conveying means 19 and 33 of the loading apparatus 11 and the entraining device 52 are arranged relative to each other such that the product support surfaces 27 and the further product support surfaces 35 can move past the entraining device 52 when moving onwards from the transferring height H around the upper deflections 79 in any position of the entraining device 52. As illustrated by the path W an outer edge of the product support surfaces 27 describes when moving onwards from the transferring height H, the entrainer 55 protrudes from the endless member 61 such that it is arranged between the conveying means 19 and the further conveying means 33 and such that the path W does not intersect with the entrainer 55. Similarly, a path of the outer edges of the further product support surfaces 35 does not intersect with the entrainer 55 (not explicitly shown).

FIG. 6 shows another embodiment of the loading apparatus 11. Compared to the embodiments of FIGS. 2A to 3B, the magazine unit 17 of this loading apparatus 11 only includes a conveying means 19 and does not include a further conveying means 33. The product support surfaces 27 that protrude from a first run 113 of the endless member 29 form a store 31 for products 13 wherein each of the products 13 may be loaded onto a respective product support surface 27. In order to prevent the products 13 from laterally sliding off the product support surfaces 27 during the lifting, a wall member 93 is arranged opposite to the run 113. Thus, two adjacent product support surfaces 27, the run 113 and the wall member 93 form a compartment 117 for a product 13 that may additionally be closed by the blocking member 51 in the transferring direction (see FIGS. 5A and 5B).

Also in this embodiment, an entraining device 52 is provided, which, however, is arranged laterally of the product 13 lifted to the transferring height H. While this entraining device 52 is arranged laterally of the product 13 and not above the magazine unit 17, the entraining device 55 may be configured similarly to the entraining device 52 depicted in FIG. 4. Thus, the entraining device 52 also comprises an alignment means 59 with two engagement members 71 to enable the alignment of the product 13 transversely to the transferring direction T while the product 13 is transferred to the feeding unit 21.

In the schematic illustration, the entrainer 55 blocks a movement of the product support surface 27 from the transferring height H onwards to the upper deflection 79 when pointing towards the product 13, such that the entrainer 55 needs to be moved further towards or around the front deflection 63 before lifting a subsequent product 13 to the transferring height H. However, the lifting of the products 13 and the movement of the endless member 61 of the entraining device 62 may be synchronized by a common control 81, which may also ensure that the entrainer 55 reaches or passes the rear deflection 65 as soon as the next product 13 is supplied at the transferring height H. Further, it will be understood that an entraining device 52 positioned lateral of a product 13 lifted to the transferring height H may as well be positioned such that the product support surfaces 27 may pass the entraining device 52 at any position of the entrainer 55. The entraining device 52 may, in all embodiments, also comprise several entrainers 55, e.g. two entrainers 55 as shown in FIGS. 1A and 1B, that may in particular be spaced apart half the length of the endless member 61.

FIGS. 8A to 8E show a further embodiment of the slicing apparatus 15, the slicing apparatus 15 comprising a feeding unit 21 for feeding products 13 into a cutting region 23 where the products 13 are cut into slices 25, and comprising a loading apparatus 11 onto which products 13 may be loaded. The slices 25 are collected at a collecting unit 99 with a conveying means 100 for transferring the completed portions to further processing steps, e.g. to a packaging machine (see FIG. 8A and also FIGS. 1A and 1B).

The loading apparatus 11 is in principle configured as described above in conjunction with FIG. 1A to 6 and comprises a magazine unit 17 with two conveying means 19 and 33, wherein the magazine unit 17 forms a store 31 and provides a plurality of compartments 117 for products 13 to be lifted to a transferring height H at which the products 13 may be transferred to the feeding unit 21. The magazine unit 17 comprises two conveying means 19 and 33 with respective endless members 29 that endlessly circulate along a running direction R. Respective product support surfaces 27 and further product support surface 35 protrude perpendicularly from the conveying means 19 and the further conveying means 33 and a respective product support surface 27 and a corresponding further product support surface 35 jointly form a product support 37 onto which a product 13 to be lifted may be loaded (see FIGS. 8A, 8B and 8D and also FIG. 1A to 6).

In addition, the loading apparatus 11 comprises an entraining device 52 that is configured to automatically transfer a product 13 that has been lifted to the transferring height H to the feeding unit 21. The entraining device 52 is arranged at the upper part of the loading apparatus 11 and above a product 13 at the transferring height H, similar to the illustrations of FIGS. 3A and 3B. In particular, the entraining device 52 is configured as shown in detail in FIG. 4. Hence, the products 13 only need to be loaded to the loading apparatus 11 at a convenient height, while the lifting and the transfer of the products 13 to the feeding unit 21 are carried out automatically by the loading apparatus 11 and the entraining device 52.

Respective drives and/or motors of the loading apparatus 11 and the entraining device 52 are connected with a controller 81 of the slicing apparatus 15 via cables 175, wherein the controller 81 is configured to control the feeding unit 21 and the slicing process in general, e.g. the motion of the blade 83, as well. By providing a common controller 81, the components of the slicing apparatus 15 may be synchronized in order to optimize the slicing process. Further, the controller 81 comprises a display 169 to provide information for an operator supervising the slicing process. For example, the number and/or the weight of products 13 that have already been cut into slices 25, the number of portions already produced and/or the number of products 13 to be sliced to complete a certain lot may be displayed. In addition, the display 169 may be configured as a touch screen via which the operator may enter commands regarding the slicing process. Additionally, the controller 81 includes several buttons 171 for configuring the slicing process. E.g., the number of slices 25 per portion, the thickness of the slices 25 or the weight of a portion may be settable via the controller 81. Further, the controller 81 may provide several slicing programs of which a suitable one may be chosen via the buttons and/or the touchscreen in dependence on the products to be sliced.

The feeding unit 21 of the slicing apparatus 15 comprises a moving device 145 that is configured to move the products 13 into the cutting region 23. The moving device 145 comprises a first endlessly circulating conveyor belt 147 and a second endlessly circulating conveyor belt 148, the conveyor belts 147 and 148 each forming a transport surface 149 for the products 13 that are fed into the cutting region 23 (see FIG. 8A). The conveyor belts 147 and 148 circulate in the feeding direction F, such that a product 13 that has been transferred to the feeding unit 21 is moved into the cutting region 23.

In addition, as may be seen in particular in FIG. 8A, the moving device 145 further comprises a transporting member 151 with two rotatable elements 153 that each correspond to a respective one of the first and the second conveyor belt 147 and 148. The rotatable elements 153 are configured as respective rollers that approximately laterally span the transport surface 149 provided by the conveyor belts 147 and 148 as may be seen in FIG. 8C, which shows the slicing apparatus 15 from above. The transporting member 151 and in particular the rotatable elements 153 are arranged above the transport surface 149 and the products 13 that are trans-ported onto the transport surface 149, and the transporting member 151 and the rotatable elements 153 are configured to apply a pressure towards the transport surface 29 onto a product 13 that is fed into the cutting region 23. Thus, the product 13 to a certain extent is clamped between the rotatable elements 153 and the transport surface 149, such that a product 13 that is fed into the cutting region 23 may be stabilized in the feeding unit 21 while slices 25 are cut off the front part of the product 13 in the cutting region 23. This enables to prevent forces transmitted by the blade 83 to the product 13 from affecting the alignment of the product 13 in the feeding unit 21 and ensure that the entire product 13 is fed into the cutting region 23 in the correct alignment, which in particular may be parallel to the feeding direction F and perpendicular to a plane in which the blade 83 moves, in particular rotates. The controller 81 may also be configured to control the pressure that the rotatable elements 153 apply onto a product 13.

As can be seen in FIG. 8B, the rotatable elements 153 are drivable or rotatable via respective drive members 173. The rotatable elements 153 are connected via a belt 154, such that a synchronous rotation may be achieved. In particular, the rotatable elements 153 may be driven by a common drive and/or motor. Thus, the products 13 may jointly be fed into the cutting region 23 by the conveyor belts 147 and 148 that provide the transport surface 149 and the corresponding rotatable elements 153. In addition, the belts 154 may be used to generate a force pointing in the direction of the transport surface 149 and acting on the rotatable elements 153, such the rotatable elements 153 may apply a pressure onto a product 13 that is fed into the cutting region 23. Further, the rotatable elements 153 may be provided with a structured, in particular toothed, surface to securely engage with an upper side of a product 13 while feeding the product 13 into the cutting region 23.

Referring to FIG. 8A, the rotatable elements 153 are arranged in a respective recess 155, such that the rotatable elements 153 are movable and/or adjustable perpendicularly to the feeding direction F and in particular in the running direction R. This enables to adjust the position of the rotatable elements 153 in dependence on the size and/or the height of a certain product 13 to be fed into the cutting region 23, such that the rotatable elements 153 may be used to apply a pressure on products 13 with varying dimensions and/or heights. In particular, the rotatable elements 153 may be configured to be displaceable by a product 13 that is moved in the feeding direction F, in particular by a front end of the product 13. As such, a product 13 reaching the rotatable elements 153 may move the rotatable elements 153 upwards against the pressure applied by the rotatable elements 153, such that the rotatable elements 153 may rotate along the front side of the product 13 until reaching the upper side of the product 13. During the further feeding of the product 13, the rotatable elements 153 may provide an essentially constant pressure onto the product 13 while rotating along its upper side to stabilize the product 13 and absorb forces transmitted by the blade 83. Alternatively, the controller 81 may be configured to adjust the position of the rotatable elements 153 in the recesses 155 in dependence on the product 13 to be fed. For example, a signal of a sensor 77 of the entraining device 52 may be used to infer the height and/or size of a product 13 that has been lifted to the transferring height H and the controller 81 may be configured to adjust the position of the rotatable elements 153 accordingly.

Further, the feeding unit 21 includes a trimming cutter 159 that comprises a circular blade 161 for cutting off a part of a product 13 that is fed into the cutting region 23 (see FIG. 8A). Thus, the product 13 may be cut into several, in particular two, parts, e.g. in order to simultaneously produce several portions of slices 25. In particular, the circular blade 161 may be used to remove a part of a product 13 that is not suitable for the further processing. For example, a fat margin of a product 13 may be removed by the trimming cutter 159. As FIG. 8B shows, respective driving members 173 may be provided for the blade 161.

In order to remove such an unusable part of a product 13 that has been cut off by the blade 161, a belt transition between the first and the second conveyor belt 147 and 148 is used to form a selection gap 157 through which the removed part of a product 13 automatically falls. Below the selection gap 157, a collection area 165 with a movable box 167 is provided in order to collect the removed parts and enable an easy disposing when the box 167 is filled. By collecting the removed parts, several products 13 may be cut into slices 25 before these parts need to be disposed, such that interruptions of the slicing process due to the necessity of disposing the removed product parts may be minimized.

Further, the selection gap 157 is used as a gap for a scanning device 163 through which the scanning device 163 may analyze a product 13 that is fed into the cutting region 23. The scanning device 163 may comprise a camera and/or at least one illumination source, in particular LED, to infer the contour and/or structure of the product 13, which may be used as a quality estimator or for inferring the product weight. In addition, further cameras and/or illumination sources may be provided to determine the contour and/or structure of a front end and/or a rear end of a product 13. Thus, the entire product dimensions may be inferred and transmitted to the controller 81. While the scanning device 163 is shown below the selection gap 157, the scanning device 163 and/or components of the scanning device 163—or an additional scanning device (not shown)—may also be arranged above the product 13 for example in the region of the selection gap 157 or may be arranged such that the scanning takes place in the region of the selection gap 157.

The slicing apparatus 15 with the loading apparatus 11 constitutes a simple and compact possibility for producing slices 25 of products 13 that may easily be loaded onto the feeding unit 21 and fed into the cutting region 23. The loading apparatus 11 disclosed herein provides a simple and comfortable possibility to load products 13 onto the slicing apparatus 15 since the products 13 may be loaded onto the loading apparatus 11 at a convenient height. In particular in conjunction with the entraining device 52, a high degree of automation of the system may be achieved and interruptions of the product processing due to a lack of products 13 supplied to the slicing apparatus 15 may be prevented.

Further, the feeding unit 21 does not need to be movable, e.g. pivotable, in order to facilitate the loading of products 13, but may remain in a preset position, e.g. with an inclination of about 20° to the horizontal. This enables a simple construction of the feeding unit 21. In addition, since the loading apparatus 11 with its magazine unit 17 may provide a store 31 of products 13, the feeding unit 21 does not need to function as a product buffer, such that the length of the slicing apparatus 15 may be minimized. As can be seen in particular in FIG. 8C to 8E, the slicing apparatus 15 may also be constructed comparably narrow, thus forming a compact and easy to assemble slicing unit having a relatively small foot print. Hence, the slicing apparatus 15 provides a compact and comfortable solution to process products 13 at a high level of automation without requiring large construction spaces.

LIST OF REFERENCE NUMBERS

11 loading apparatus
13 product
15 slicing apparatus
17 magazine unit
19 conveying means
21 feeding unit
23 cutting region
25 slice
27 product support surface
29 endless member of the conveying means
31 store
33 further conveying means
35 further product support surface
37 product support
39 entrance side
41 exit side
43 driving means
45 further driving means
47 pressing member
49 lateral border
51 blocking member
52 entraining device
53 driving member
54 barrier
55 entrainer
57 rear end of the product
59 alignment means
61 endless member of the driving member
63 front deflection
65 rear deflection
67 pushing surface
69 rack and pinion gear
71 engagement member
73 gear wheel
75 rack
77 sensor
79 upper deflection
80 lower deflection 81 controller
83 blade
85 frame
87 pressing member of the slicing apparatus
89 pressing roll
91 lambda kinematic
93 wall member
95 conveying means of the feeding unit
97 pulley
99 collecting unit
100 conveying means of the collecting unit
101 base of the slicing apparatus
103 base of the loading apparatus
105 cutting edge
107 portion
109 fastening
111 lifting area
113 first run
115 second run
117 compartment
119 rod
120 gear wheel
121 gear wheel
123 axis
124 axis
125 arm
127 frame
129 axis
131 axis
133 guiding arm
135 driving rod
137 connection
139 structure
141 rear end of the frame
143 middle section of the frame
145 moving device
147 first conveyor belt
149 second conveyor belt
151 transport member
153 rotatable element
155 recess
157 selection gap
159 trimming cutter
161 circular blade
163 scanning device
165 collection area
167 box
169 display
171 button
173 drive member
175 cable
177 opening
A arrow
F feeding direction
H transferring height
L loading position
P1 blocking position
P2 release position
O operation position
R running direction
S switching axis
T transferring direction
W path

The invention claimed is:

1. A loading apparatus for loading food products onto or into a slicing apparatus, the loading apparatus comprising at least one magazine unit,
the at least one magazine unit including a conveying means that endlessly circulates along a running direction,
wherein the conveying means is configured to lift the products to a transferring height at which the products can be transferred to a feeding unit of the slicing apparatus that is configured to feed the products to a cutting region in which the products are cut into slices,
wherein the conveying means includes several product support surfaces,
the product support surfaces being oriented essentially perpendicular to the running direction and positioned subsequently along the running direction with a space between each other,
wherein at least one product is loadable onto a respective product support surface for lifting the product to the transferring height,
wherein the products can be transferred to the feeding unit in a transferring direction, wherein the magazine unit includes a blocking member, the blocking member being arranged to prevent products that are below or above the transferring height from moving along the transferring direction,
wherein the blocking member is movable between a release position and a blocking position, wherein a motion in the transferring direction of a product being at the transferring height is enabled in the release position and prevented in the blocking position.

2. The loading apparatus according to claim 1, wherein the at least one magazine unit forms a store for a plurality of products, the store providing a respective product support surface for each of the plurality of products, wherein the plurality of products is liftable simultaneously by the loading apparatus.

3. The loading apparatus according to claim 1, wherein the at least one magazine unit includes a further conveying means that endlessly circulates along the running direction, the further conveying means including several further product support surfaces that are oriented essentially perpendicular to the running direction, wherein the number of product support surfaces of the conveying means equals the number of further product support surfaces of the further conveying means.

4. The loading apparatus according to claim 3, wherein the conveying means and the further conveying means are oriented oppositely to each other such that a respective product support surface of the conveying means and a respective further product support surface of the further conveying means are located at the same height regarding the running direction and jointly form a product support.

5. The loading apparatus according to claim 1, wherein the magazine unit comprises an entrance side at which the products can be loaded onto the product support surfaces and wherein the magazine unit comprises an exit side opposing the entrance side, wherein products lifted to the transferring height can be transferred to the feeding unit via the exit side.

6. The loading apparatus according claim 1, wherein at least one pressing member is provided that is configured to push a product lifted to the transferring height against a lateral border of the loading apparatus.

7. The loading apparatus according to claim 1,
comprising an entraining device that is configured to transfer products lifted to the transferring height along a transferring direction to a feeding unit of the slicing apparatus.

8. The loading apparatus according to claim 7,
wherein the endlessly circulating conveying means and the entraining device are arranged relative to each other such that the product support surfaces, when moving further from the transferring height in the direction of an upper deflection of the conveying means, can move past the entraining device in any position of the entraining device.

9. The loading apparatus according to claim 7,
comprising a sensor for detecting a product lifted to the transferring height.

10. The loading apparatus according to claim 9,
comprising a controller that is configured to trigger the entraining device to move the product along the transferring direction in response to a signal of the sensor.

11. The loading apparatus according to claim 7,
wherein the entraining device is configured to align a product laterally to the transferring direction while moving the product along the transferring direction.

12. The loading apparatus according to claim 7,
wherein the entraining device comprises:
a driving member that is movable in the transferring direction;
at least one entrainer that is arranged on the driving member, the entrainer being configured to engage with a rear end of the product such that the product is movable in the transferring direction; and
a drivable alignment means that is configured to align the product at its rear end transversely to the transferring direction.

13. The loading apparatus according to claim 12,
wherein the entraining device is configured to transfer products supplied by the at least one magazine unit to the feeding unit of the slicing apparatus.

14. An entraining device for transferring supplied food products in a transferring direction to a feeding unit of a slicing apparatus comprising:
a driving member that is movable in the transferring direction;
at least one entrainer that is arranged on the driving member, the entrainer being configured to engage with a rear end of the product such that the product is movable in the transferring direction; and
a drivable alignment means that is configured to align the product at its rear end transversely to the transferring direction.

15. The entraining device according to claim 14,
wherein the driving member comprises an endless member that endlessly circulates between a front deflection and a rear deflection, the at least one entrainer protruding from the endless member.

16. The entraining device according to claim 14,
wherein the alignment means is integrated into the at least one entrainer.

17. The entraining device according to claim 14,
wherein the alignment means is drivable through the motion of at least one of the driving member or the entrainer along the transferring direction.

18. The entraining device according to claim 14,
wherein the alignment means is drivable through a rack and pinion gear.

19. The entraining device according to claim 14,
wherein the alignment means includes at least one engagement member that is rotatable via a gear wheel, the gear wheel being moved along the transferring direction and meshing with a rack.

20. The entraining device according to claim 14,
wherein the entraining device includes a sensor for detecting supplied products.

21. A slicing apparatus for slicing food products into slices, comprising:
a feeding unit configured to feed products along a feeding direction into a cutting region in which a blade for slicing the products into slices is arranged;
and at least one of:
a. a loading apparatus for loading food products onto or into a slicing apparatus, the loading apparatus comprising at least one magazine unit, the at least one magazine unit including a conveying means that endlessly circulates along a running direction, wherein the conveying means is configured to lift the products to a transferring height at which the products can be transferred to a feeding unit of the slicing apparatus that is configured to feed the products to a cutting region in which the products are cut into slices, wherein the conveying means includes several product support surfaces, the product support surfaces being oriented essentially perpendicular to the running direction and positioned subsequently along the running direction with a space between each other, wherein at least one product is loadable onto a respective product support surface for lifting the product to the transferring height;
b. an entraining device that is configured to transfer products lifted to the transferring height along a transferring direction to a feeding unit of the slicing apparatus; and
c. an entraining device for transferring supplied food products in a transferring direction to a feeding unit of a slicing apparatus comprising:
a driving member that is movable in the transferring direction; at least one entrainer that is arranged on the driving member, the entrainer being configured to engage with a rear end of the product such that the product is movable in the transferring direction; and a drivable alignment means that is configured to align the product at its rear end transversely to the transferring direction.

22. A slicing apparatus for slicing food products into slices, comprising:
a feeding unit configured to feed products along a feeding direction into a cutting region in which a blade for slicing the products into slices is arranged, and
a pressing member for pressing a front part of a product towards at least one of a surface of the feeding unit or a cutting edge while the product is cut into slices,
wherein the pressing member is movable by a lambda kinematic,
the lambda kinematic being configured to move the pressing member essentially parallel to a cutting plane in which the blade of the slicing apparatus moves.

23. A loading apparatus for loading food products onto or into a slicing apparatus,
the loading apparatus comprising at least one magazine unit,
the at least one magazine unit including a conveying means that endlessly circulates along a running direction, wherein the conveying means is configured to lift the products to a transferring height at which the products can be transferred to a feeding unit of the slicing apparatus that is configured to feed the products to a cutting region in which the products are cut into slices, wherein the conveying means includes several product support surfaces, the product support surfaces being oriented essentially perpendicular to the running direction and positioned subsequently along the running direction with a space between each other, wherein at least one product is loadable onto a respective product support surface for lifting the product to the transferring height, wherein at least one pressing member is provided that is configured to push a product lifted to the transferring height against a lateral border of the loading apparatus.

24. A loading apparatus for loading food products onto or into a slicing apparatus, the loading apparatus comprising at least one magazine unit, the at least one magazine unit including a conveying means that endlessly circulates along a running direction, wherein the conveying means is configured to lift the products to a transferring height at which the products can be transferred to a feeding unit of the slicing apparatus that is configured to feed the products to a cutting region in which the products are cut into slices, wherein the conveying means includes several product support surfaces, the product support surfaces being oriented essentially perpendicular to the running direction and positioned subsequently along the running direction with a space between each other, wherein at least one product is loadable onto a respective product support surface for lifting the product to the transferring height, and comprising an entraining device that is configured to transfer products lifted to the transferring height along a transferring direction to a feeding unit of the slicing apparatus.

25. The loading apparatus according to claim 24, wherein the at least one magazine unit forms a store for a plurality of products, the store providing a respective product support surface for each of the plurality of products, wherein the plurality of products is liftable simultaneously by the loading apparatus.

26. The loading apparatus according to claim 24, wherein the at least one magazine unit includes a further conveying means that endlessly circulates along the running direction, the further conveying means including several further product support surfaces that are oriented essentially perpendicular to the running direction, wherein the number of product support surfaces of the conveying means equals the number of further product support surfaces of the further conveying means.

27. The loading apparatus according to claim 26, wherein the conveying means and the further conveying means are oriented oppositely to each other such that a respective product support surface of the conveying means and a respective further product support surface of the further conveying means are located at the same height regarding the running direction and jointly form a product support.

28. The loading apparatus according to claim 24, wherein the magazine unit comprises an entrance side at which the products can be loaded onto the product support surfaces and wherein the magazine unit comprises an exit side opposing the entrance side, wherein products lifted to the transferring height can be transferred to the feeding unit via the exit side.

29. The loading apparatus according claim 24, wherein at least one pressing member is provided that is configured to push a product lifted to the transferring height against a lateral border of the loading apparatus.

30. The loading apparatus according claim 24, wherein the products can be transferred to the feeding unit in a transferring direction, wherein the magazine unit includes a blocking member, the blocking member being arranged to prevent products that are below or above the transferring height from moving along the transferring direction.

31. The loading apparatus according claim 30, wherein the blocking member is movable between a release position and a blocking position, wherein a motion in the transferring direction of a product being at the transferring height is enabled in the release position and prevented in the blocking position.

32. The loading apparatus according to claim 24, wherein the endlessly circulating conveying means and the entraining device are arranged relative to each other such that the product support surfaces, when moving further from the transferring height in the direction of an upper deflection of the conveying means, can move past the entraining device in any position of the entraining device.

33. The loading apparatus according to claim 24, comprising a sensor for detecting a product lifted to the transferring height.

34. The loading apparatus according to claim 33, comprising a controller that is configured to trigger the entraining device to move the product along the transferring direction in response to a signal of the sensor.

35. The loading apparatus according to claim 24, wherein the entraining device is configured to align a product laterally to the transferring direction while moving the product along the transferring direction.

36. The loading apparatus according to claim 24, wherein the entraining device comprises:

a driving member that is movable in the transferring direction;

at least one entrainer that is arranged on the driving member, the entrainer being configured to engage with a rear end of the product such that the product is movable in the transferring direction; and a drivable alignment means that is configured to align the product at its rear end transversely to the transferring direction.

37. The loading apparatus according to claim 36, wherein the entraining device is configured to transfer products supplied by the at least one magazine unit to the feeding unit of the slicing apparatus.

* * * * *